United States Patent [19]

Marlowe

[11] 4,169,659
[45] Oct. 2, 1979

[54] MULTIPLE STANDARD TELEVISION SYNC GENERATOR

[75] Inventor: Frank J. Marlowe, Kingston, N.J.

[73] Assignee: RCA Corporation, New York, N.Y.

[21] Appl. No.: 903,071

[22] Filed: May 5, 1978

[30] Foreign Application Priority Data

May 30, 1977 [GB] United Kingdom ............... 22812/77

[51] Int. Cl.² ............................................. H04N 5/06
[52] U.S. Cl. ................................................... 358/150
[58] Field of Search ........................................ 358/150

[56] References Cited

U.S. PATENT DOCUMENTS 3,777,063  12/1973  Meacham .......................... 358/150

*Primary Examiner*—Robert L. Richardson
*Attorney, Agent, or Firm*—Eugene M. Whitacre; William H. Meagher

[57] ABSTRACT

A television synchronization signal generator circuit is provided for generating television synchronization, blanking, and drive signals. The sync generator is programmable to provide synchronization signals in the PAL, SECAM, NTSC, and PAL-M standards at the appropriate 525 or 625 line rate. A synchronous horizontal counter is used to divide clock pulses having a frequency of 134 times the horizontal line frequency down to the horizontal line frequency. A vertical counter divides a phase advanced signal having a frequency of twice the horizontal line frequency by 525 or 625 to arrive at the vertical field rate. Logic gates decode the horizontal and vertical counter output signals to condition output signal flip-flops which are retimed by the input clock pulses to eliminate phase delays between the clock pulses and the output signals. Reset inputs are provided for synchronizing the sync generator to an external signal source. In a preferred embodiment of the invention, a programmable counter is provided for dividing the chrominance subcarrier signal by an appropriate integer to develop a signal having a frequency of one-quarter the horizontal line rate, H/4. The H/4 signal may be used to synchronize the sync generator to the chrominance subcarrier signal.

18 Claims, 19 Drawing Figures

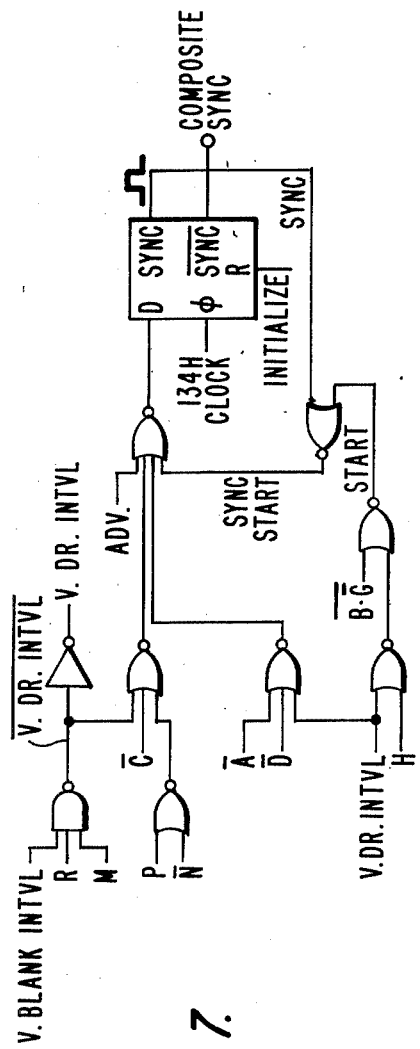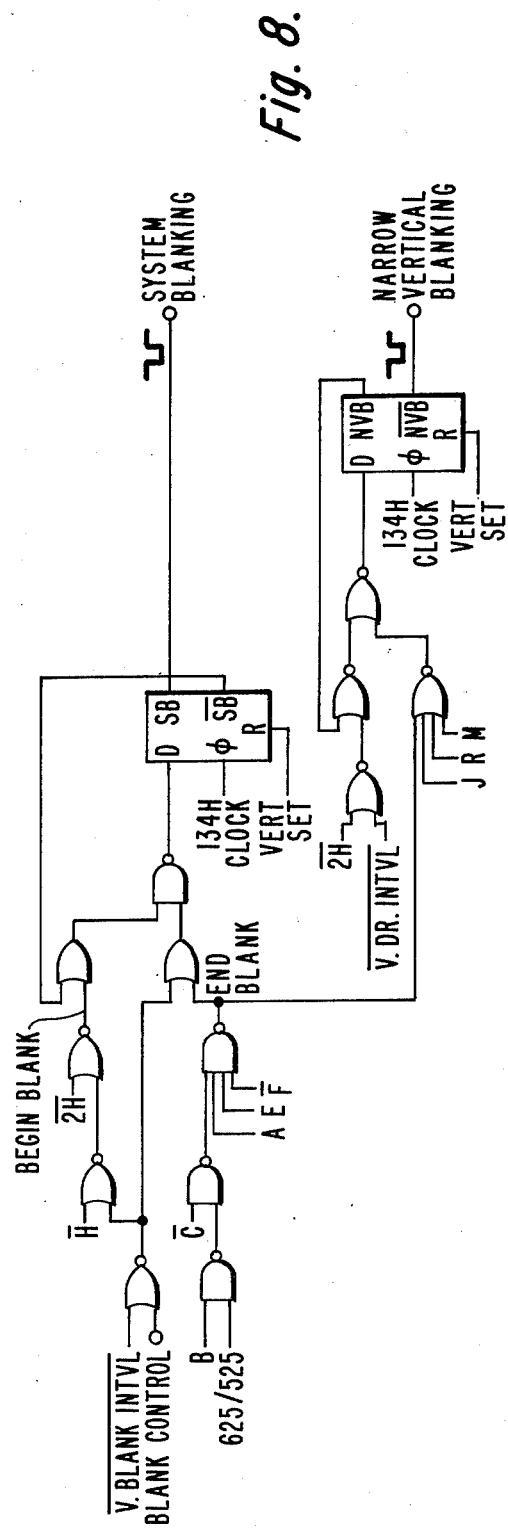
Fig. 7.
Fig. 8.

MULTIPLE STANDARD TELEVISION SYNC GENERATOR

The present invention relates generally to television sync generators, and particularly to a novel television sync generator which is programmed to provide one of a plurality of standard synchronization signals.

A synchronizing signal generator is used in a television camera to control the horizontal and vertical drive and the horizontal and vertical blanking of the electron beam so that a composite TV picture is produced by the camera. Sync generators are also used in video tape recorder systems for producing a recorded composite video signal from a source of color signals, and to produce a duplicate video tape from an existing video tape.

Color television cameras and video tape recorder systems operate under a variety of incompatible sync signal standards throughout the world. The four main television standards in use today are 625-line PAL, 625-line SECAM, 525-line NTSC, and 525-line PAL-M. Broadcast equipment conventionally includes a sync generator circuit which is compatible with the standard of the country in which it is to operate. The equipment is thus restricted to operation in those countries which employ the television synchronization signal standard for which it was designed. When broadcast equipment is to be constructed for operation in a country employing a different television standard, the sync generator must be redesigned and reconstructed to be compatible with the different standard. It is therefore desirable to provide a television sync generator circuit that can be programmed to produce television synchronization signals according to any one of the above four standards, thereby permitting the use of the same circuit in any item of broadcast equipment, regardless of the standard under which it operates.

In response to the requirements of the broadcast industry in light of improvements in technology, television cameras are becoming smaller and more compact than ever before. In particular, portable television cameras are gaining wide acceptance among broadcasters. It is therefore desirable that television camera sync generator circuits be smaller and more compact than previous circuits and preferably be adapted to integrated circuit manufacture.

To be suitable for integrated circuit application, it is desirable for the sync generator circuit to be comprised of components which are adaptable to integrated circuit technology. Thus, components such as capacitors, resistors, and discrete devices should be avoided where possible. Sync generator circuits of the prior art have commonly employed monostable multivibrators and differentiating circuits which require RC networks for timing purposes. In addition to their unsuitability for integrated circuit fabrication, these circuits require careful adjustment during manufacture and are inherently unstable due to temperature changes, aging, and other causes.

The four television standards mentioned above all have specific requirements governing the timing of the synchronizing pulses and the pulse widths. Prior art sync generators conventionally derive the necessary sync pulses by dividing down a high frequency signal which is in excess of the horizontal sync rate to a lower frequency which is compatible with the vertical sync rate. Conventional dividing circuits, such as ripple counters, have a finite switching time, or propagation delay, which results in a cumulative switching delay from the high frequency signal to the derived low frequency signal. To overcome the timing errors resulting from propagation delay, it is desirable to maintain a close timing relationship between the high frequency signal and the synchronizing pulses through the use of synchronous counters.

Additionally, it is desirable to construct the sync generator from low power, inexpensive, and readily available digital logic circuitry.

Through application of the principles of the present invention, a television synchronizing signal generator is provided with a source of clock pulses having a frequency which exceeds the horizontal line frequency. A synchronous horizontal counter divides the clock pulses down to the horizontal line frequency. The use of a synchronous counter eliminates propagation delay problems which are inherent in non-synchronous counters. A vertical counter is coupled to an output of the horizontal counter for producing signals which are integral multiples of the vertical field rate. When a signal having a frequency of twice the horizontal line frequency is used to clock the vertical counter, the output signals of the vertical counter are suitable for the generation of properly interlaced sync signals. The phase of the vertical counter clocking signal is advanced relative to the horizontal line frequency signal produced by the horizontal counter to ensure stabilization of the vertical counter outputs during horizontal sync intervals. The advanced clocking signal also permits the use of a non-synchronous vertical counter, thereby reducing the complexity and number of components required for the vertical counter.

Output signals from the horizontal and vertical counters are coupled to gating means which develop conditioning signals for the generation of drive, sync and blanking output signals. The gating means utilizes no flip-flops or other counters, which would act to increase components and add increased propagation delays to the sync generator.

The conditioning signals are coupled to output flip-flops which generate the drive, sync and blanking output signals. The output flip-flops are re-timed by clock pulses from the source of clock pulses to eliminate any propagation delay resulting from the vertical counter output signals. The retiming by the clock pulses thus maintains a constant phase relationship between the input clock pulse to the sync generator and the drive, sync and blanking signals produced at the outputs.

The television synchronizing signal generator described above readily lends itself to implementation as a multiple standard television sync generator. The frequency of the clock pulses produced by the source of clock pulses is varied according to the number of horizontal lines in the television sync standard. Programming means is included to select the number of horizontal lines generated in a television field and to select a particular television sync standard. No modification of the synchronous horizontal counter is necessary when switching from one standard to another; however, operation of the vertical counter is modified according to the number of horizontal lines in the television field, and the gating means are modified according to both the number of lines in the field and the particular television sync standard selected. The drive, sync, and blanking signals produced by the output flip-flops will thus vary with the television sync standard selected.

Further features of the present invention are associated with the provision of a subcarrier counter which divides the chrominance subcarrier signal by a predetermined integer for producing a signal related to the horizontal synchronizing signal component of the selected synchronizing signal. This signal may be advantageously utilized to synchronize the source of clock signals to the chrominance subcarrier signal.

The present invention also provides a novel method for generating a PAL burst blanking signal. The PAL burst blanking signal occurs during varying positions of the field synchronizing interval, repeating its position in the interval every four vertical fields. In the prior art, the position of this signal was determined by counting the vertical fields and generating a blanking signal in accordance with the state of the field counter. In the present invention, the need for a field counter in PAL burst blanking signal generation has been obviated by the gating of starting and ending windows, or intervals, prior to and following the equalizing pulse intervals in each vertical field. The occurrence of a transition in an H/2 signal having a frequency of half the horizontal line frequency within the windows accurately begins and ends the PAL burst blanking signal for every television field, without the use of a field counter.

Figure 1:
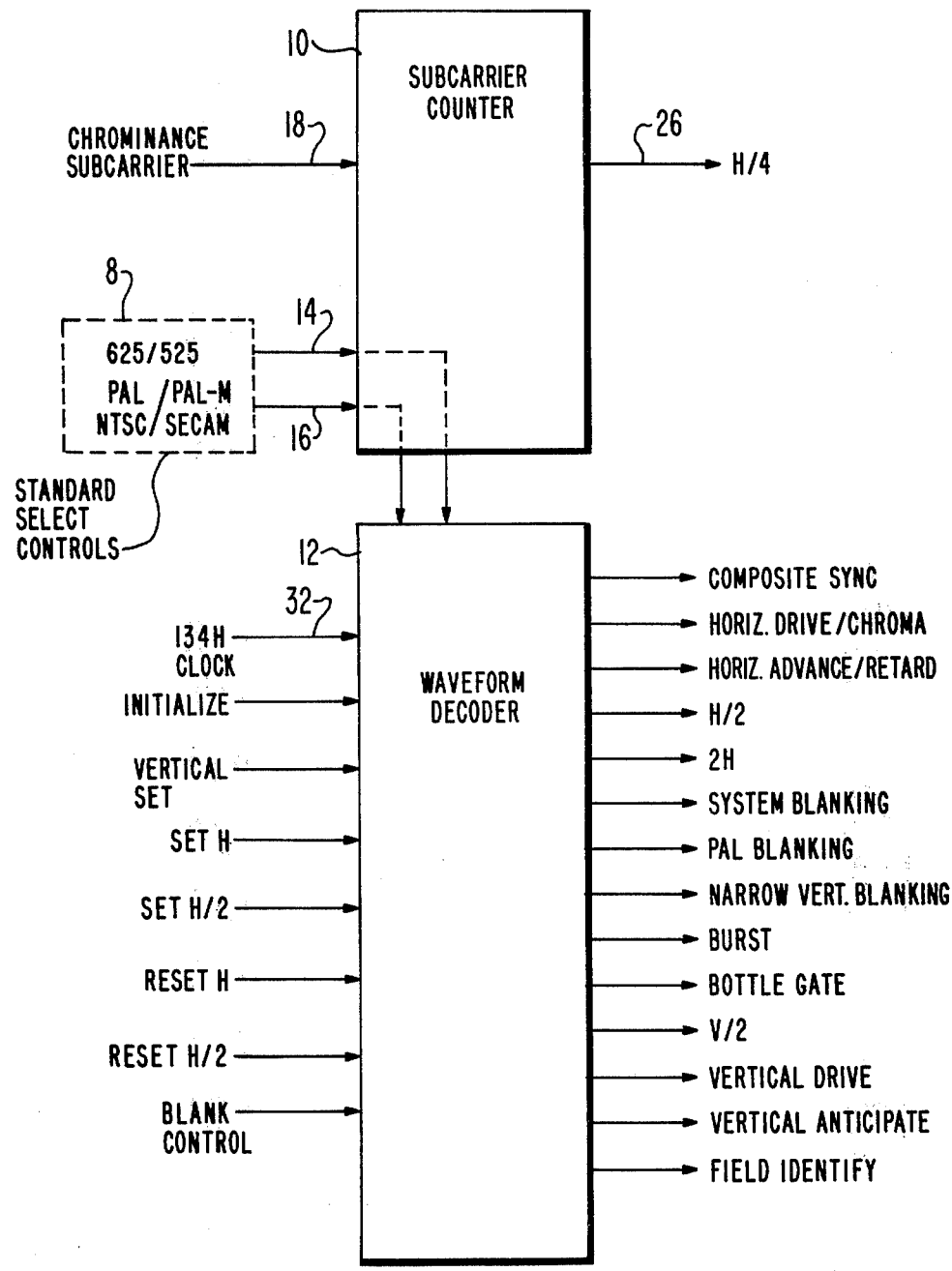
FIG. 1 illustrates, in block diagram form, a sync generator circuit constructed in accordance with the principles of the present invention.
Figure 2:
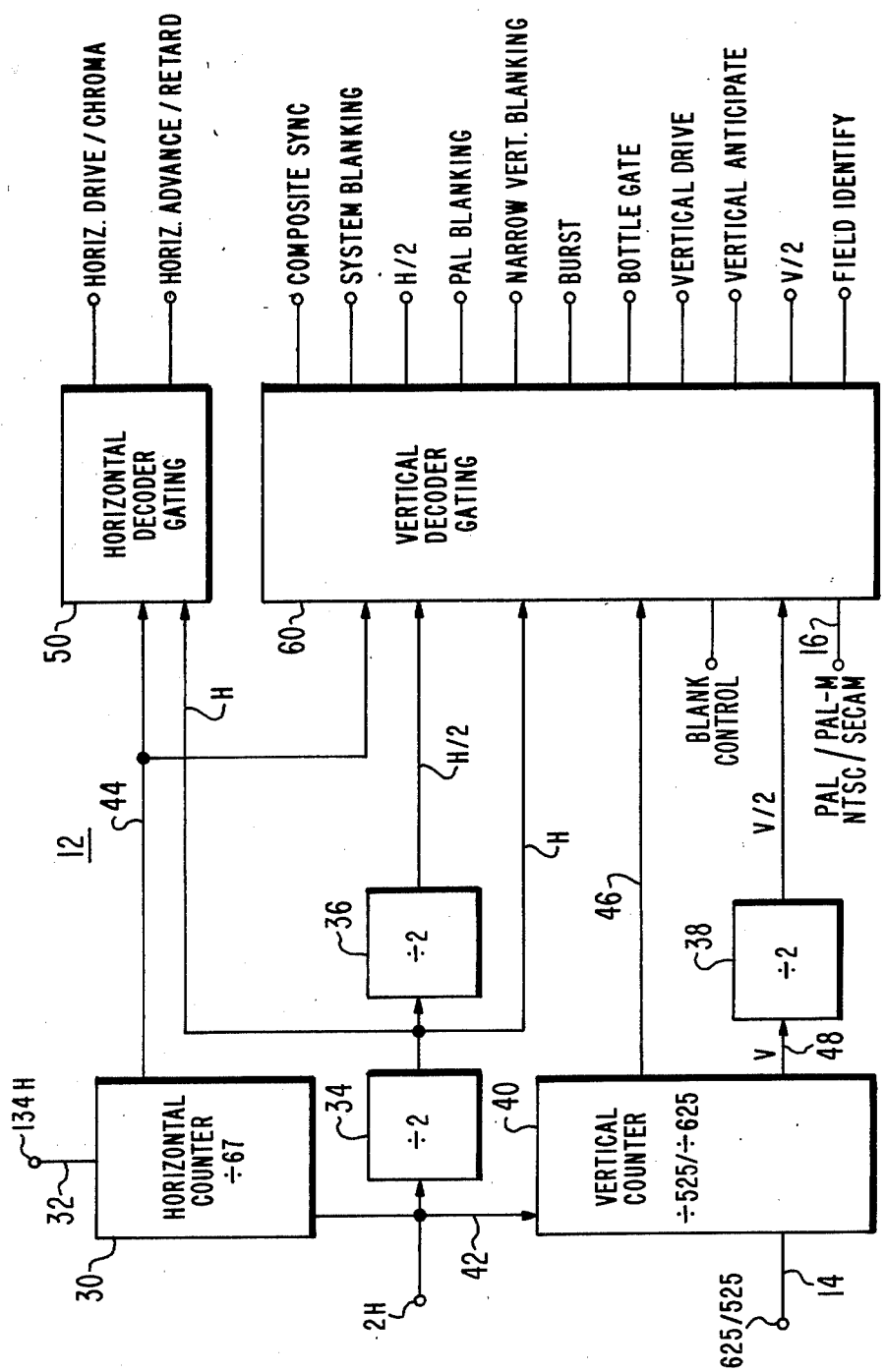
FIG. 2 illustrates, in block diagram form, a detailed embodiment of the waveform decoder of FIG. 1.
Figure 12:
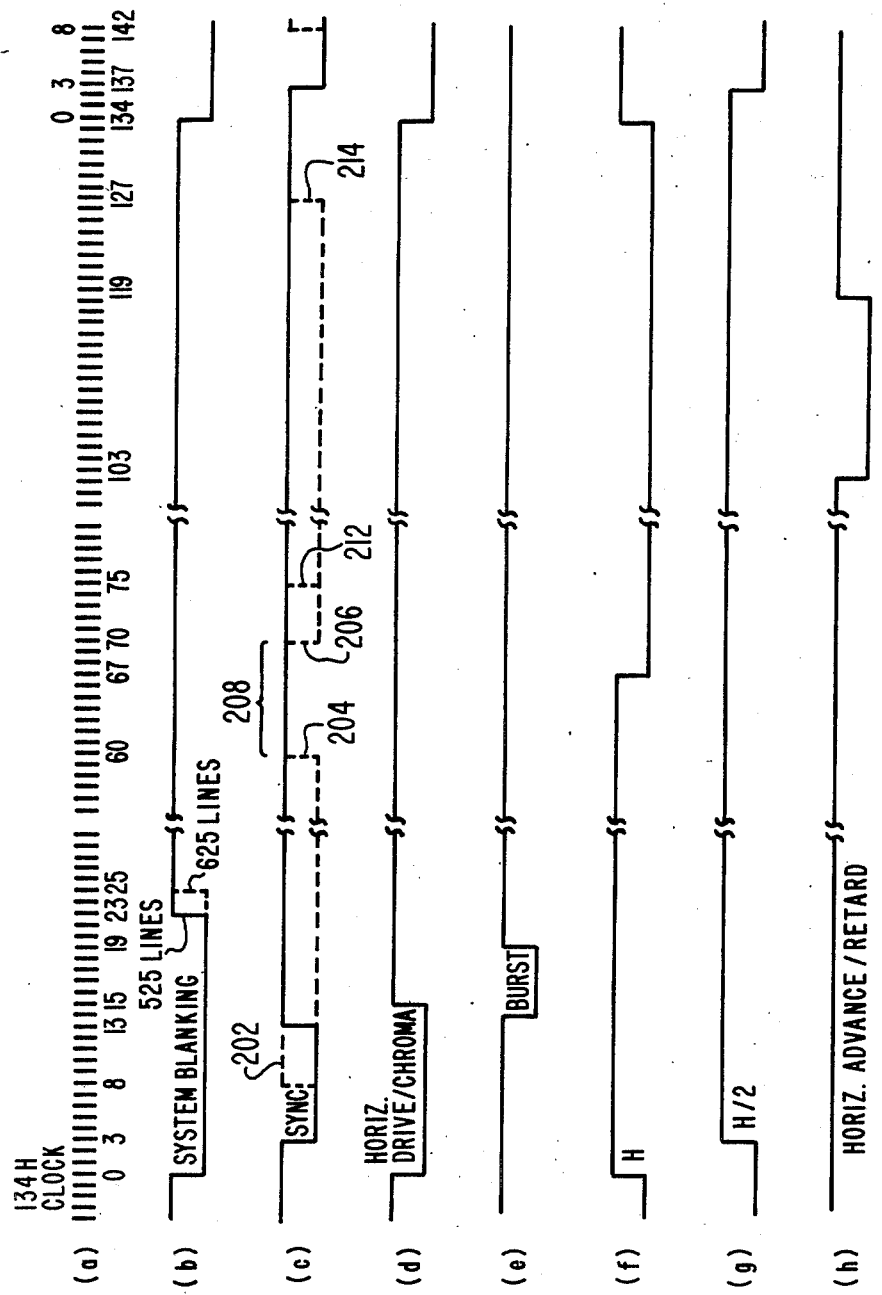
Figure 13:
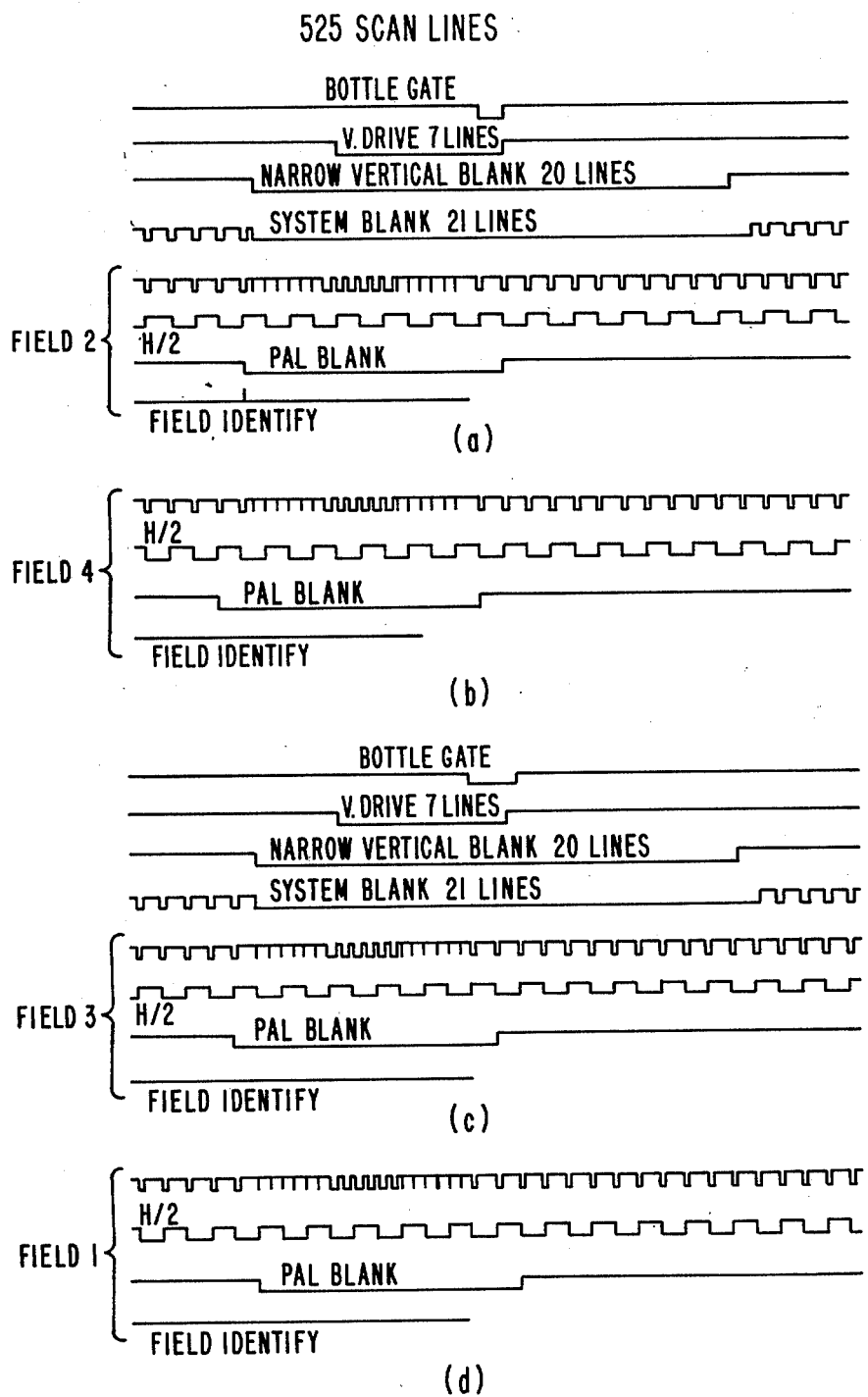
Figure 14:
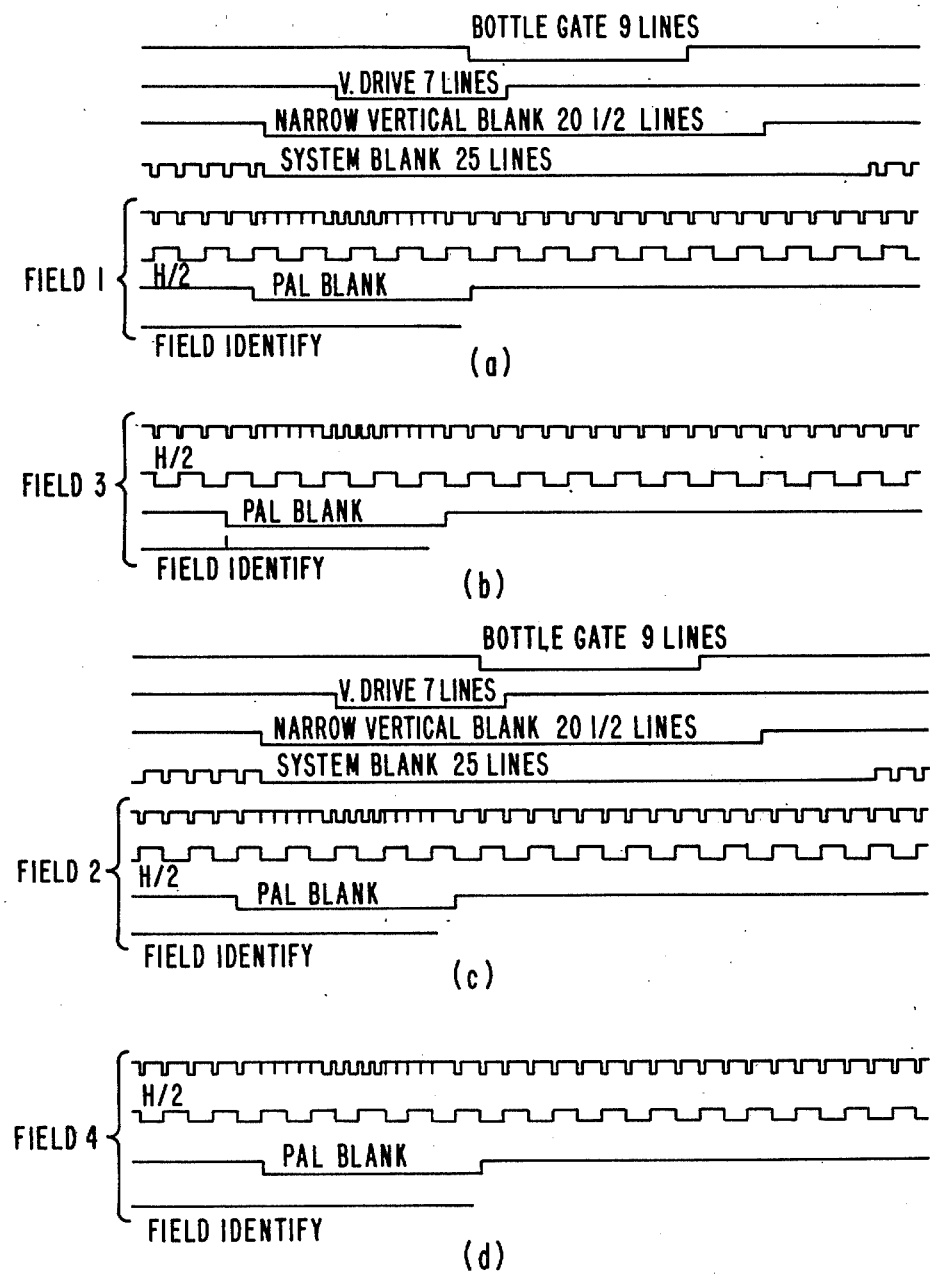
Figure 15:
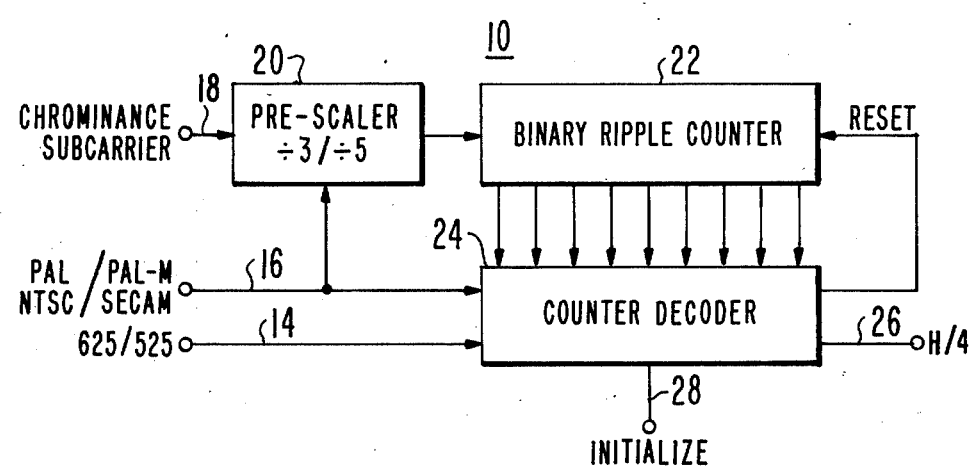
Figure 16:
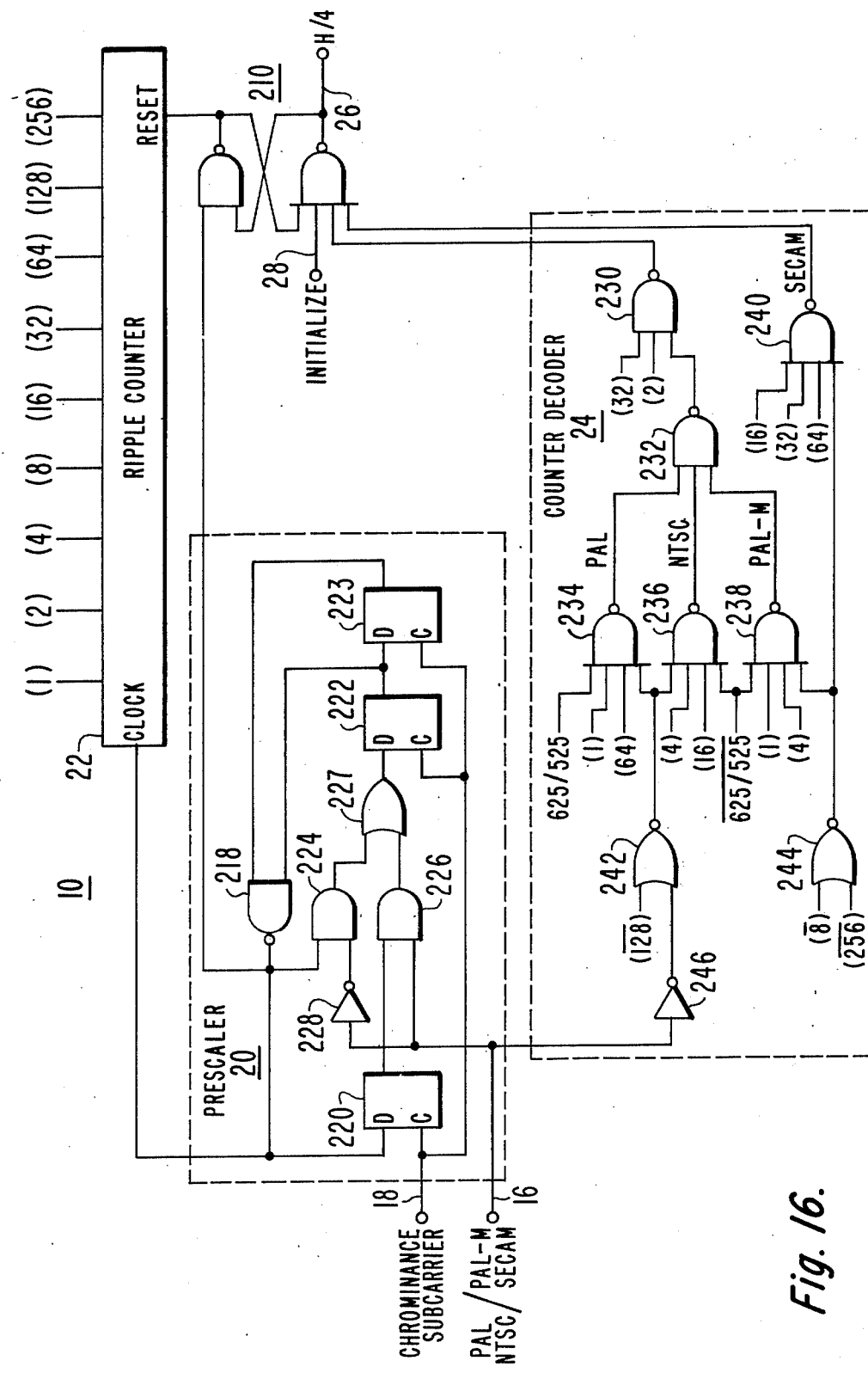
Figure 17:
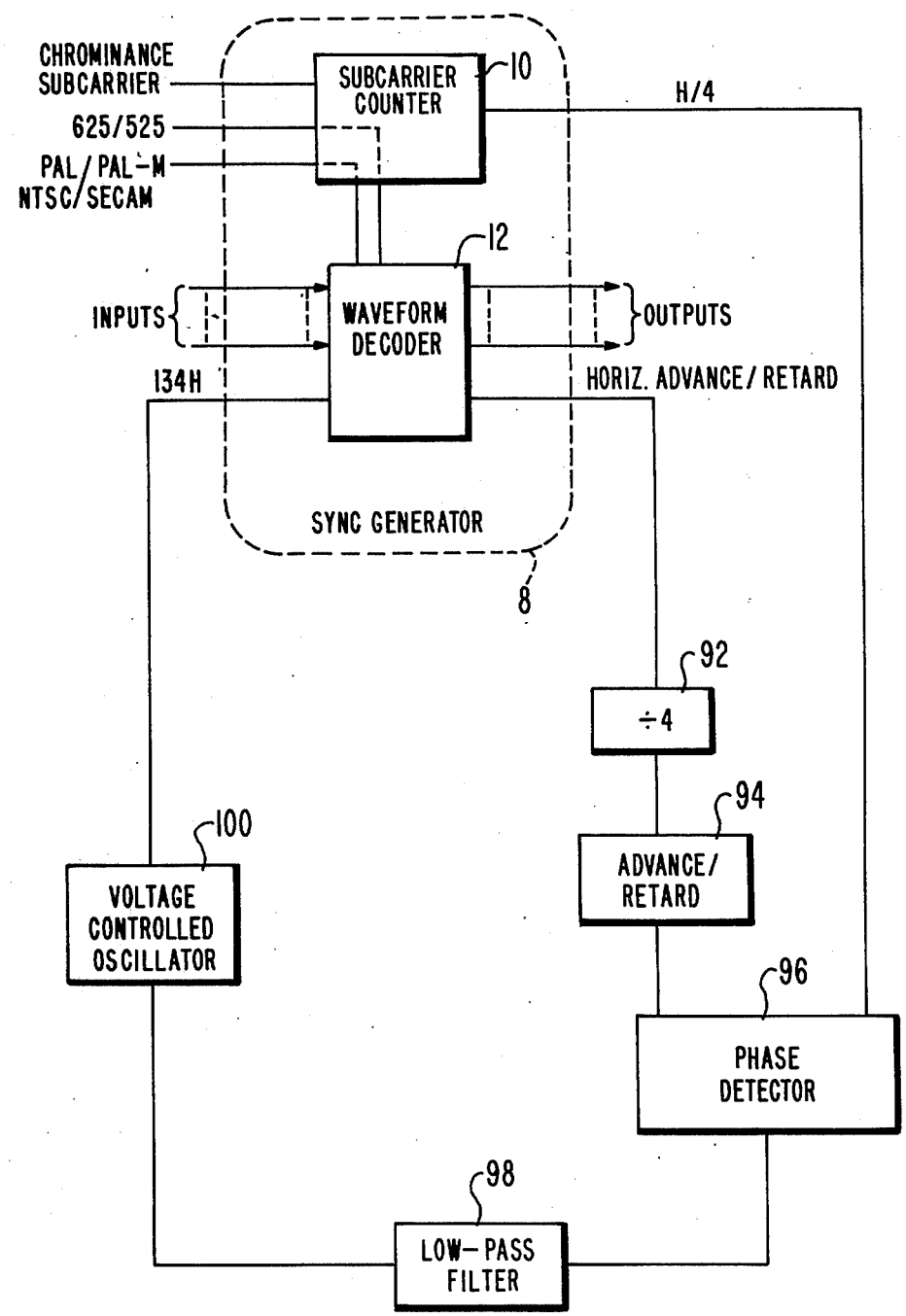
Figure 18:
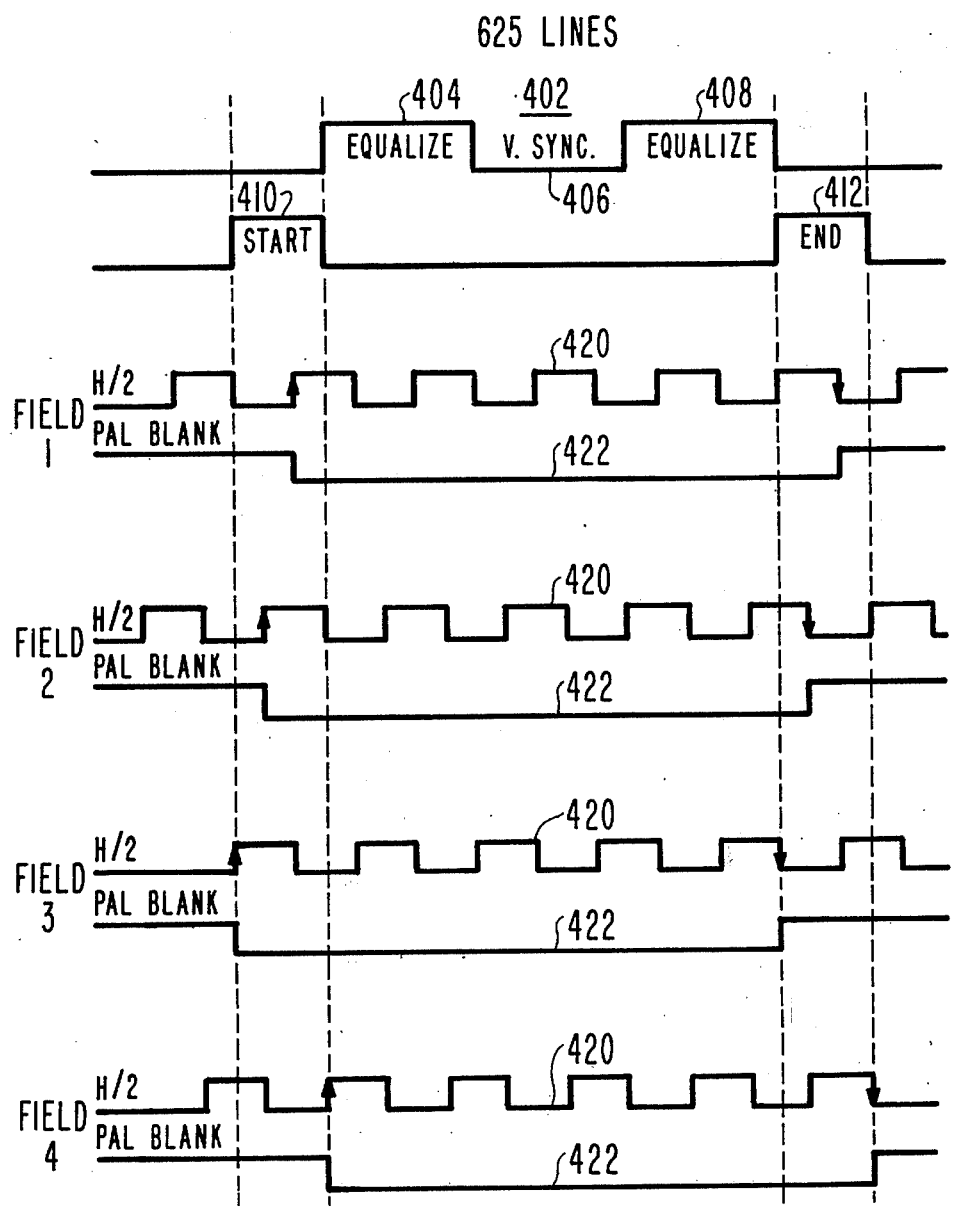
Figure 19:
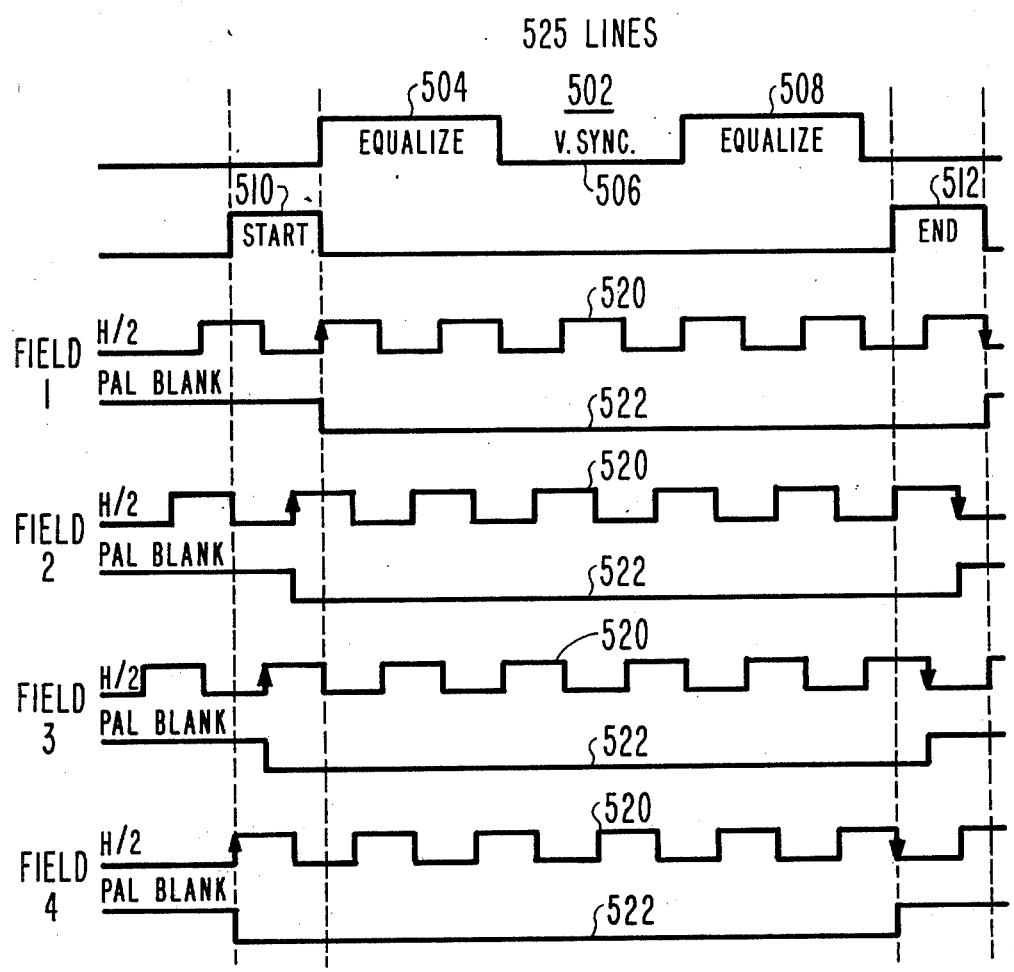

FIGS. 7, 8, 9, 10 and 11 together illustrate schematically the vertical decoder gating of the waveform decoder of FIG. 2;

FIG. 12 illustrates horizontal blanking and synchronizing waveforms of the waveform decoder of FIG. 2;

FIG. 13 illustrates the vertical blanking and synchronizing waveforms produced by the waveform decoder of FIG. 2 according to a 525-line television standard;

FIG. 14 illustrates the vertical blanking and synchronizing waveforms produced by the waveform decoder of FIG. 2 according to a 625-line television standard;

FIG. 15 illustrates, in block diagram form, a detailed representation of the subcarrier counter of FIG. 1;

FIG. 16 illustrates schematically a circuit arrangement suitable for use in the subcarrier counter of FIG. 15;

FIG. 17 illustrates, in block diagram form, a further embodiment in which the subcarrier counter is utilized to synchronize the source of clock signals for the waveform decoder;

FIG. 18 illustrates waveforms which determine the generation of a PAL burst blanking signal in a 625-line system; and FIG. 19 illustrates waveforms which determine the generation of a PAL burst blanking signal in a 525-line system.

The sync generator of FIG. 1 is comprised of a subcarrier counter 10 and a waveform decoder 12. Standard select controls 8 are used to program the sync generator for the generation of a specific television standard. Conductor 14 is used to select either a 625-line frame or a 525-line frame. Conductor 16 is used to select either the PAL, NTSC, SECAM or PAL-M television standard. The logical signal levels for the standard select controls are illustrated in Table 1. The table shows that a logical zero on conductor 14 will select a 525-line frame, while a logical one on conductor 14 will select a 625-line frame. The PAL or the NTSC standard is selected by applying a logical one to conductor 16, while the application of a logical zero selects the PAL-M or SECAM television standard. The standard select controls may be used to program the sync generator for a specific television standard having a predetermined number of lines per frame. For instance, a logical zero on conductor 14 and a logical one on conductor 16 of FIG. 1 will result in the generation of a 525-line NTSC synchronization signal. Similarly, if a logical one is applied to conductor 14 and a logical zero to conductor 16, the sync generator will produce a 625-line SECAM synchronization signal.

Subcarrier counter 10 includes a programmable counter that divides the chrominance subcarrier by an appropriate integer to generate an output signal having a frequency of H/4, where H is the horizontal line frequency. As the discussion of the embodiment of FIG. 17 will illustrate, the H/4 signal may be used to synchronize the source of clock pulses for waveform decoder 12.

Waveform decoder 12 receives inputs from standard select controls 8 and a 134 H clock signal on conductor 32, where H is the horizontal scan frequency of the selected television standard. The standard select lines determine the horizontal and vertical blanking and synchronization pulse timing for the selected television standard.

Table 2

| Horizontal Timing | | | | | | |
|---|---|---|---|---|---|---|
| 525 Lines (NTSC, PAL-M) | H = (29.97/sec) (525) = 15734/sec=63.5 μsec F = 134 H = 2.108 MHz One clock period = .474 μsec | | | | | |
|  | Clock Per. | CCIR Minμs | BTS Minμs | Actual μsec | BTS Maxμs | CCIR Maxμs |
| Horiz. blank | 23 | 10.50 | 10.70 | 10.91 | 11.10 | 11.40 |
| Horiz. sync. | 10 | 4.13 | 4.60 | 4.74 | 4.80 | 5.08 |
| Equalize | 5 | 2.29 |  | 2.37 |  | 2.54 |
| Vert. Serration | 10 | 3.81 |  | 4.74 |  | 5.34 |
| Front Porch | 3 | 1.27 | 1.40 | 1.42 | 1.60 | 2.22 |
| Breezeway | 1 | 0.38 | 0.465 | .474 | .735 | 1.58 |
| Burst gate (burst) | 5 | (2.23) | (2.514 .nom.) | 2.37 |  | (3.11) |
| 625 Lines (PAL, SECAM) | H = (25/sec) (625) = 15625/sec=64 μsec F = 134 H = 2.09 MHz One clock period = .478 μsec | | | | | |
|  | Clock Per. | CCIR Minμs | BTS Minμs | Actual μsec | BTS Maxμs | CCIR Maxμs |
| Horiz. blank | 25 | 11.70 |  | 11.94 |  | 12.30 |
| Horiz. sync | 10 | 4.50 |  | 4.78 |  | 4.90 |
| Equalize | 5 | 2.25 |  | 2.38 |  | 2.45 |
| Vert. Serration | 10 | 4.50 |  | 4.78 |  | 4.90 |
| Front Porch | 3 | 1.20 |  | 1.43 |  | 1.80 |

Table 2-continued

| | | Horizontal Timing | | |
|---|---|---|---|---|
| Breezeway | 1 | — | .478 | — |
| Burst gate (burst) | 5 | (2.02) | 2.39 | (2.48) |

The 134 H clock divides each horizontal line into 134 equal time periods. These pulses are used to precisely define the leading and trailing edges and the duration of the horizontal and vertical pulses of each of the four television standards. Table 2 illustrates the pulse width requirements of the 525 and 625-line systems and the actual pulse widths produced by an embodiment of the present invention. The present minimum and maximum pulse widths shown in Table 2 for the 525 and 625-line systems may be found in CCIR Report 624, Tables I, I-1 and I-2 in Vol. IX of the Report of the XIIIth Plenary Assembly, held in Geneva, Switzerland in 1974. In the United States, pulse width requirements for the NTSC system are determined by the Federal Communications Commission, in cooperation with the Electronic Industries Association (EIA). In addition to the present CCIR and FCC pulse width requirements, Table 2 also shows the narrower pulse width requirements which have been recommended for the NTSC system by the EIA Engineering Department Broadcast Television Systems Committee.

These narrower pulse width requirements known as the "BTS standards", may be found in Appendix I of EIA Television Systems Bulletin No. 4, entitled "EIA Recommended Practice For Horizontal Sync, Horizontal Blanking And Burst Timing In Television Broadcasting", published in the SMPTE Journal, Vol. 86, January, 1977. The BTS standards were proposed after field tests performed by industry organizations established that variation in horizontal sync and burst timing within FCC tolerances for color television signals is a cause of some program nonuniformity on the home-viewer's television receiver. The BTS standards all lie within the range of the FCC values and are presently required by many broadcasters in anticipation of their adoption by the FCC.

By selecting a clock frequency of 134 H in the present invention, the sync generator is capable of meeting the CCIR, FCC and BTS standards. Moreover, broadcast experience has shown that the most critical synchronizing signal is the horizontal blanking pulse. This pulse is added to the composite video signal in a television camera, and undergoes numerous changes as the video signal is detected, stripped, regenerated, and recombined by signal processing equipment prior to broadcast transmission. During this processing, the horizontal blanking interval often becomes "stretched" in duration by bandwidth-limiting processors and transmission lines. The broadcast transmission of a stretched horizontal blanking interval will not only violate local broadcasting requirements, but will also result in an undesirable black bordering of the television image on the home receiver. The present invention overcomes this problem by generating an NTSC horizontal blanking pulse with a duration of 10.91 microseconds, which is within 0.01 microseconds of the nominal BTS value of 10.90 microseconds and well within the FCC maximum value of 11.1 microseconds.

Other clock frequencies were examined in arriving at the preferred 134 H clock frequency. An 82 H clock was found to satisfy both the BTS and CCIR standards and also results in the saving of one flip-flop in the waveform decoder. However, an 82 H clock would result in a horizontal blanking pulse duration of 10.97 microseconds, which does not approximate the BTS nominal value of 10.90 microseconds as closely as the blanking pulse produced in a 134 H clock system and for this reason it was not chosen. A 110 H clock meets all of the CCIR requirements, but its front porch pulse width of 1.74 microseconds does not satisfy the BTS standard. Likewise, clock frequencies of 186 H and 192 H meet all of the standard requirements except the front porch pulse width.

Higher clock frequencies, such as 204 H, 216 H, 228 H, 244 H, and 256 H, were found to satisfy all of the CCIR and BTS standard requirements. However, these clock signal frequencies are all above 3 MHz and would require the use of expensive, high-speed logic in the waveform decoder. These clock frequencies were all rejected in favor of the 134 H clock, which requires signal frequencies of approximately 2.1 MHz.

The waveform decoder of FIG. 1 has seven additional input signals which provide further features for the sync generator. The INITIALIZE signal is used to set all of the counters and flip-flops of the waveform decoder and subcarrier counter that are not reset by other input signals to an initial condition. This signal is useful in the testing of the waveform decoder.

The VERTICAL SET input signal permits the waveform decoder counters to be reset to the beginning of a vertical synchronizing interval. This input may be used to synchronize the waveform decoder to an external source of vertical synchronizing signals.

The SET H, SET H/2, RESET H and RESET H/2 inputs may be used to synchronize the horizontal blanking and synchronization signals to an external source of horizontal synchronizing signals. The availability of both set and reset inputs for the H and H/2 flip-flops permits the waveform decoder to be initialized to the beginning of any one of the four unique fields of the PAL or PAL-M systems, as well as to either of the two unique fields of the NTSC or SECAM systems, thereby permitting the sync generator to be accurately phase-locked to a reference sync source in any system.

The BLANK CONTROL input selects one of two states. In a first state, the sync generator will produce the required SYSTEM BLANKING pulse for the selected television standard. When the BLANK CONTROL signal is in a second state, the SYSTEM BLANKING output signal will produce horizontal blanking pulses continuously, even during the vertical blanking interval. A broadcaster may then externally generate a non-standard vertical blanking pulse during the vertical blanking interval, if one is desired.

Waveform decoder 12 of FIG. 1 generates 14 output signals. The COMPOSITE SYNC signal contains both horizontal and vertical synchronizing pulses. The HORIZONTAL DRIVE/CHROMA signal is produced during each horizontal synchronizing interval and is used to trigger the horizontal deflection system in the television camera. The HORIZONTAL DRIVE/CHROMA signal is also used in the SECAM system to blank the chroma signal in the camera at the beginning of each horizontal line. The HORIZONTAL ADVANCE/RETARD signal precedes the horizontal sync interval by a predetermined time and may be used in cooperation with the H/4 signal to synchronize waveform decoder 12 to a remote chrominance subcarrier. The HORIZONTAL ADVANCE/RETARD signal will be discussed in further detail in conjunction with FIG. 17.

The H/2 signal contains pulses occurring at one-half the horizontal line rate. This signal may be used to indicate color phasing in the PAL system. The 2 H signal may be used to generate an external vertical blanking signal, since it recurs at half-line intervals, concurrently with the equalizing pulses.

The SYSTEM BLANKING signal is a pulse train containing both the horizontal and vertical blanking signals. The horizontal blanking pulses have different pulse widths for the 525 and 625-line systems, as shown in Table 2. During the vertical synchronizing interval, the SYSTEM BLANKING pulse has a duration of 21 full lines for the 525-line systems and 25 full lines for the 625-line systems. The PAL BLANKING signal recurs at varying times within the vertical synchronizing interval in the four fields of the PAL system. The NARROW VERTICAL BLANKING signal has a pulse duration of 20 lines during the vertical synchronization interval in the 525-line system and 20 ½ lines during the vertical synchronizing interval of the 625-line system. This signal is used by broadcasters utilizing the NTSC standard who desire a shorter vertical blanking interval than the standard SYSTEM BLANKING interval of 21 lines. The 20-line NARROW VERTICAL BLANKING pulse may be substituted for the 21-line vertical component of SYSTEM BLANKING in conjunction with the previously described BLANK CONTROL input, which causes horizontal blanking pulses to be generated continuously in the SYSTEM BLANKING signal. In this mode the NARROW VERTICAL BLANKING signal must be combined with SYSTEM BLANKING by additional circuitry external to the sync generator.

The BURST signal recurs at the horizontal line rate and is utilized to gate the color burst signal during the back porch of the horizontal synchronizing interval. The BOTTLE GATE signal is a chrominance synchronizing pulse in the SECAM system. The BOTTLE GATE pulse is used to gate color bursts during the vertical blanking interval in the SECAM system.

The V/2 signal is a frame rate pulse signal which may be used to synchronize video tape recorders. The VERTICAL DRIVE signal is used to trigger the vertical deflection circuitry in a television camera. The VERTICAL ANTICIPATE signal precedes the vertical synchronization interval by a predetermined time and may be utilized to synchronize video tape recorders.

The FIELD IDENTIFY signal produces a recurring pulse at one quarter of the field rate which permits the identification of one of the four unique fields in the PAL television system. The FIELD IDENTIFY signal may be used in video tape recorders to quickly synchronize the sync generator by generating any one of the four fields immediately after the identified field. Thus, the FIELD IDENTIFY signal permits the sync generator to generate field four immediately after field one, thereby permitting synchronization within a single field interval without the necessity of cycling through the three intervening fields.

FIG. 2 is a more detailed block diagram of the waveform decoder 12 of FIG. 1. Horizontal counter 30 is clocked by the 134 H clock signal from conductor 32. Horizontal counter 30 divides the 134 H clock signal by 67 to produce a 2 H signal on conductor 42. The 2 H signal is coupled to divide-by-2 counter 34 and vertical counter 40. Output signals from the individual flip-flop stages of horizontal counter 30 are coupled to horizontal decoder gating 50 and vertical decoder gating 60 by multiple conductors 44. Divide-by-2 counter 34 produces an H signal, which is coupled to horizontal decoder gating 50 and vertical decoder gating 60. The H signal is also coupled to divide-by-2 counter 36 which produces and H/2 signal which is coupled to vertical decoder gating 60.

Vertical counter 40 divides a 2 H rate signal by 525 or 625, as selected by the 625/525 selection signal on conductor 14. Vertical counter 40 produces an output signal on conductor 48 which recurs at the vertical interval rate. Individual outputs from several of the flip-flop states of vertical counter 40 are coupled to vertical decoder gating 60 by multiple conductors 46. The vertical rate signal on conductor 48 is coupled to a divide-by-2 counter 38 which produces signal V/2, at the television frame rate frequency.

The horizontal decoder gating 50 produces the HORIZONTAL DRIVE/CHROMA and HORIZONTAL ADVANCE/RETARD output signals. Vertical decoder gating 60 produces the remaining synchronization, drive and blanking signals of the selected television standard.

Figure 3:
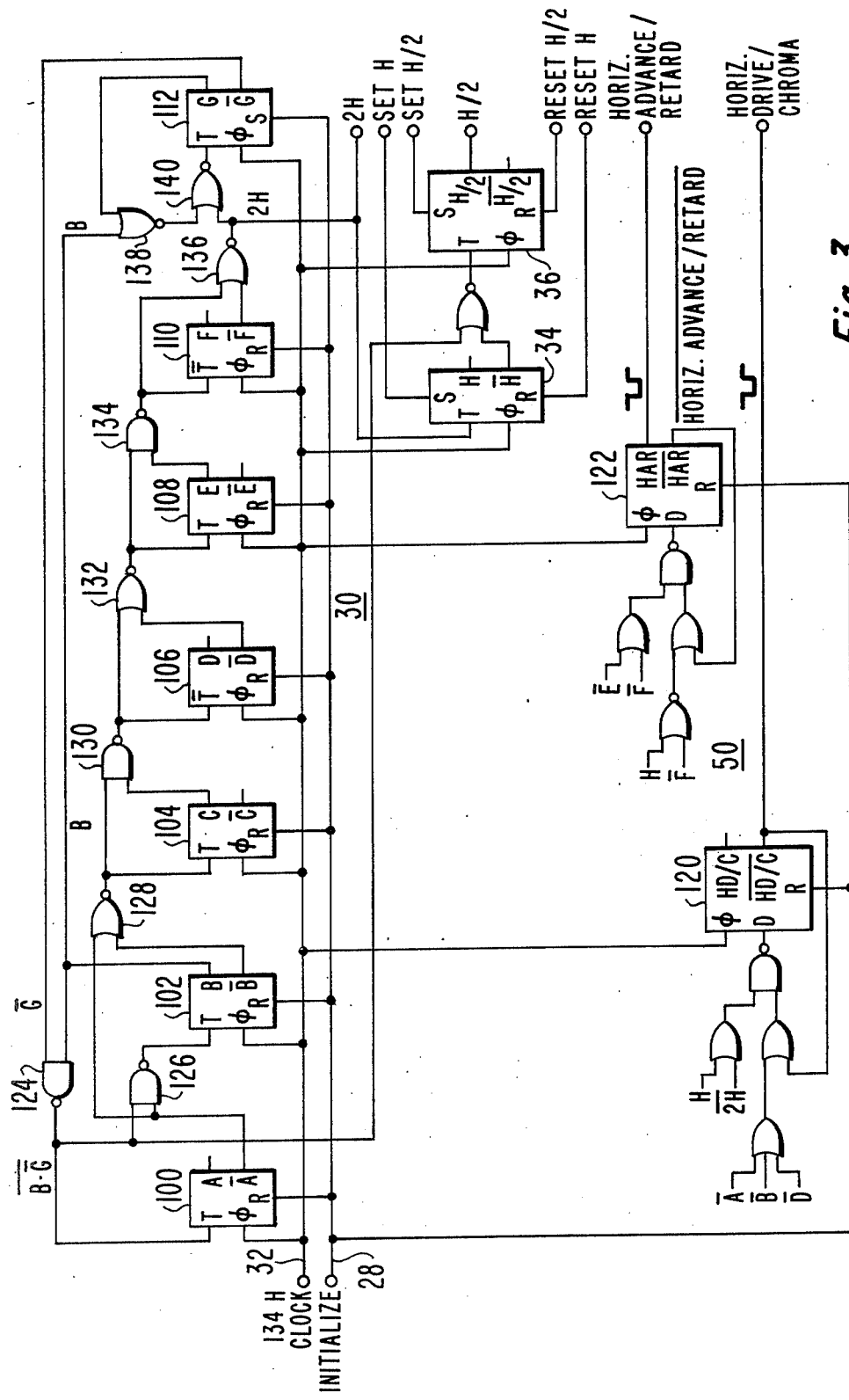
FIG. 3 illustrates schematically a circuit arrangement for the horizontal counter and horizontal decoder gating of the sync waveform decoder of FIG. 2.

In FIG. 3, horizontal counter 30 and horizontal decoder gating 50 of the waveform decoder are illustrated in further detail. Horizontal counter 30 is a synchronous, look-ahead counter employing seven toggle flip-flops to divide the 134 H clock by 67. The horizontal counter has been implemented using RCA concentric closed logic (CCL) COS-MOS digital circuitry. Testing has shown that CCL toggle flip-flops have a propagation delay time from input to output of approximately 40 nanoseconds. Similarly, two input logic gates, such as gates 124-136 in FIG. 3, have a propagation delay of approximately 20 nanoseconds. These measurements were taken at a supply voltage of 10 volts. If horizontal counter 30 were implemented as a ripple-through counter, the total counter delay would be the sum of the propagation delays of each stage, resulting in a total propagation delay of 280 nanoseconds. As Table 2 indicates, the frequency of the 134 H clock for the 525-line system is 2.108 MHz, with a clock period of 474 nanoseconds. Therefore, the time duration for clock pulses to ripple through an entire 7-stage ripple-through counter would be over one-half the clock pulse period. At a lower supply voltage, the propagation delay can exceed the clock pulse period.

The problems caused by propagation delays are even more significant in horizontal decoder gating 50 and vertical decoder gating 60 in FIG. 2. As FIG. 3 illustrates, horizontal counter stages 100-112 have individual outputs labelled A through G. These individual outputs and their complements, $\bar{A}$ through $\bar{G}$, are used in the horizontal and vertical decoder gating circuits 50 and 60 to generate all of the drive, blanking and synchronization signals for the sync generator. For instance, the setting and resetting of HORIZONTAL ADVANCE/RETARD flip-flop 122 in FIG. 3 is determined by the states of horizontal counter output signals E, F, and signal H of flip-flop 34. If a ripple-through counter were used in horizontal counter 30, the counter would assume intermediate transient states while the clock pulses ripple through the counter from the first stage to the last stage. The transient states will take a finite amount of time to propagate through the horizontal and vertical decoder gating, providing spurious set and reset signals to output flip-flops, such as HORI- ZONTAL ADVANCE/RETARD flip-flop 122, and causing the production of unpredictable waveforms by the sync generator.

The problems caused by propagation delay are eliminated in horizontal counter 30 in FIG. 3. Logic gates 124-140 provide a "look-ahead" capability for the counter whereby each flip-flop receives an input signal in advance of the clock pulse on which it is to change state. For instance, flip-flop 104 will only change state when flip-flops 100 and 102 are both in a set condition after the previous clock pulse. NOR gate 128 senses this condition by applying a "high" signal to the toggle input of flip-flop 104 when both complementary outputs $\overline{A}$ and $\overline{B}$ are in a "low" condition. Thus, on the next clock pulse, flip-flop 104 will change state and flip-flops A and B will both switch to a reset condition.

Similarly, NAND gate 130 conditions the toggle input to flip-flop 106 for a change of stage on the succeeding clock pulse after flip-flops 100, 102, and 104 are in a set condition. NAND gate 130 receives a high signal from NOR gate 128 when flip-flops 100 and 102 are set, and a high signal from the C output of flip-flop 104 when flip-flop 104 is set. When the inputs to NAND gate 130 are both high, a low signals is produced at the output of the gate, and flip-flop 106 will change state on the next clock pulse. This is because flip-flop 106 has a complementary $\overline{T}$ input which causes a change of state for a low input signal.

Gates 132, 134 and 136 operate in the same fashion as gates 128 and 130. Therefore, it is seen that flip-flops 100-112 of horizontal counter 30 will change state simultaneously, and will be in a stable state after a 40 nanosecond propagation delay. Gates 124-136 will then "look ahead" to the next clock pulse by sampling the outputs of preceding gates in the chain and condition the toggle inputs of flip-flops 100-112 for transition on the next clock pulse. Although there is a finite amount of ripple delay as gates 124-136 stabilize in response to changes in the previous gates in the chain, the total worst case propagation time for all of the seven gates to stabilize is only 7 times 20 nanoseconds, or 140 nanoseconds. The gates are thus in a stable condition far in advance of the next 134 H clock pulse. Moreover, this gate propagation delay has no effect on the outputs of flip-flops 100-112, which remain in a stable condition for all but the first 40 nanoseconds of a clock period, as discussed above.

Since horizontal counter 30 is a divide by 67 counter, means must be provided to return the counter to its initial condition after sixty-seven 134 H clock pulses have been counted. One technique for resetting a counter is to generate a gated control signal when the states of the individual flip-flop stages have reached the maximum desired count. The control signal is then used to reset all of the counter stages to the initial condition. However, it has been found that resetting all of the flip-flops in the horizontal counter simultaneously takes an undesirably large amount of time, resulting in the generation of the unstable, transient conditions mentioned above. Moreover, since the maximum desired count of one counting cycle is also the first count of the next counting cycle, the counter will be in an improper state (maximum count) for a portion of the first clock period of the succeeding counting cycle. Also, while the reset pulse must be applied to the flip-flops for a considerable period of time to ensure reset, it must also be removed in sufficient time to permit the flip-flops to clock properly on the next clock pulse. These problems have been overcome in the horizontal counter of the present invention by the use of a novel gating technique which resets the counter to its initial condition without the necessity of a reset control pulse.

Figure 4:
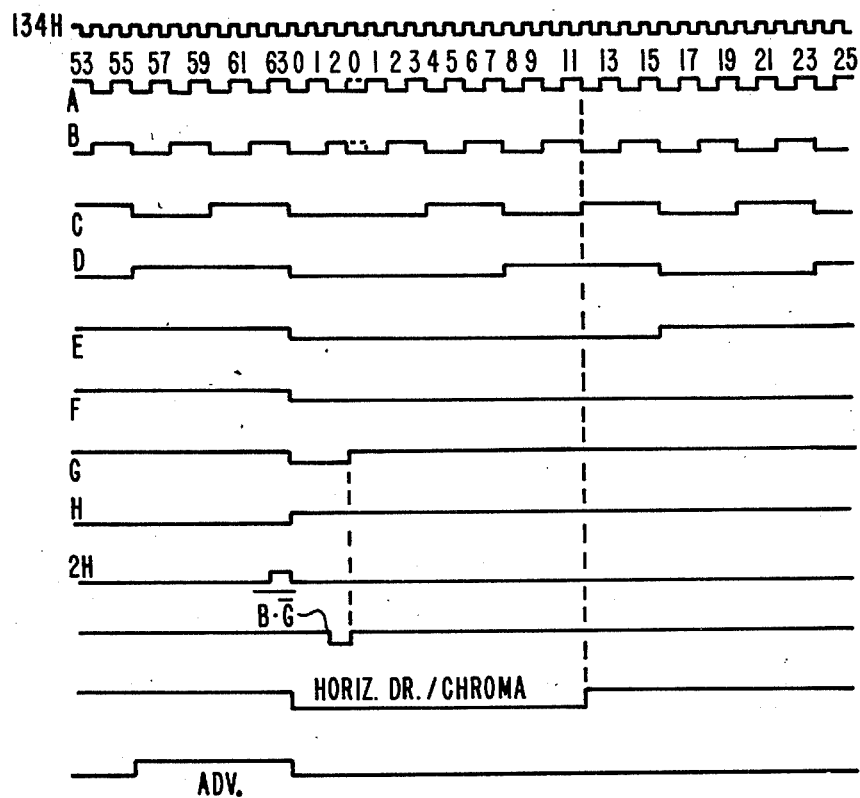
FIG. 4 illustrates the output waveforms of the horizontal counter of FIG. 3.

Flip-flops 100 through 110 count the first sixty-four 134 H clock pulses in a normal manner, beginning with a count of 0 and ending with a count of 63, at which time flip-flops 100 through 110 are all in a set condition. The counting sequence is partially illustrated in FIG. 4, in which lines A through G represent the outputs of flip-flops 100 through 112, respectively. FIG. 4 shows that at the count of 63, outputs A through F are all in a set condition. Output G of flip-flop 112 is also in a set condition, since this flip-flop is normally in a set state. After the count of 63, both inputs to NOR gate 136 are low and the 2 H pulse output of the gate is high. The 2 H pulse is coupled to NOR gate 140, thereby providing a low signal level to the toggle input of flip-flop 112. On the next clock pulse, outputs A through F switch to a low state, as does the G output of flip-flop 112. The $\overline{G}$ output of flip-flop 112 changes to a high state and is coupled to one input of NAND gate 124. Output signal $\overline{B.G}$ of NAND gate 124 remains high, because the B output of flip-flop 102 is low at this time. The counter is incremented to a count of 2, or 66, after the next two clock pulses, at which time the B output of flip-flop 102 is high, as shown in FIG. 4. Since both inputs to NAND gate 124 are now high, output signal $\overline{B.G}$ is now low, which will prevent flip-flop 100 from setting on the next clock pulse. Output pulse $\overline{B.G}$ is also coupled to NAND gate 126, which will cause the B output of flip-flop 102 to change state on the next clock pulse. The B output of flip-flop 102 is also coupled to an input of NOR gate 138, which causes the output of NOR gate 138 to be low. Since both inputs to NOR gate 140 are now low, the output of NOR gate 140 is high, which will cause flip-flop 112 to change state on the next clock pulse. Thus, on the next pulse of the 134 H clock, which is the 68th count of the clock, flip-flop 100 will not be set, flip-flop 102 will reset, and flip-flop 112 will set, as shown in FIG. 4. This is the initial state of the horizontal counter. The counter will then proceed to count another sequence of sixty-seven 134 H clock pulses.

The output of HORIZONTAL DRIVE/CHROMA flip-flop 120 is also illustrated in FIG. 4. This flip-flop will set when H is low and 2 H is high, which occurs at count 63 of every other cycle of the horizontal counter. The HORIZONTAL DRIVE/CHROMA signal thus occurs once every horizontal line. The HORIZONTAL DRIVE/CHROMA pulse is terminated after count 11, when the A, B and D signals are all in a high state.

The HORIZONTAL ADVANCE/RETARD flip-flop 122 operates in a similar manner to the HORIZONTAL DRIVE/CHROMA flip-flop. This flip-flop is normally in a set state, and resets once every horizontal line at a count of 36 and is reset 16 clock pulses later at a count of 52.

Flip-flop 34 in FIG. 3 divides the 2 H signal from gate 136 by 2 to produce an H signal at the horizontal line rate. This flip-flop may set and reset by external signals SET H and RESET H, respectively.

Flip-flop 36 divides the H signal of flip-flop 34 by two to produce an H/2 signal. Since the toggle input to flip-flop 36 is also conditioned by the $\overline{B.G}$ pulse, the H/2 signal will change state three clock pulse periods after the occurrence of the H and 2 H pulses. Flip-flop 36 is also capable of being set and reset externally by inputs SET H/2 and RESET H/2, respectively.

Figure 5:
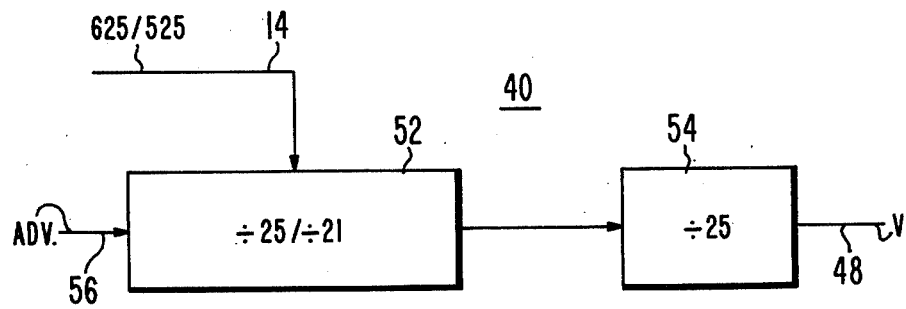
FIG. 5 illustrates, in block diagram form, a detailed embodiment of the vertical counter of FIG. 2.

FIG. 5 illustrates vertical counter 40 in further detail. In order to utilize a minimum number of counter stages when operating in either the 525 or 625-line systems, the counter is partitioned into a divide-by-25 or divide-by-21 stage 52 and a divide-by-25 stage 54. Stage 52 receives an input on conductor 14 from the 625/525 line SELECT control to determine the appropriate divisor for the selected television standard. In a 625-line system, counter 52 divides the ADVANCE signal on conductor 56 by 25. The ADVANCE signal is a gated signal derived from predetermined outputs of horizontal counter 30 and recurs at a 2 H rate. For a 525-line system, counter 52 divides the ADVANCE signal by 21. The output of counter stage 52 is coupled to divide-by-25 stage 54 to further divide down the ADVANCE signal. The signal V which appears at the output of counter 54 on conductor 48 recurs at the vertical interval rate. Thus, vertical counter 40 will divide the 2H-rate ADVANCE signal by 25 times 25, or 625, for a 625-line system, or by 21 times 25, or 525, for a 525-line system.

Figure 6:
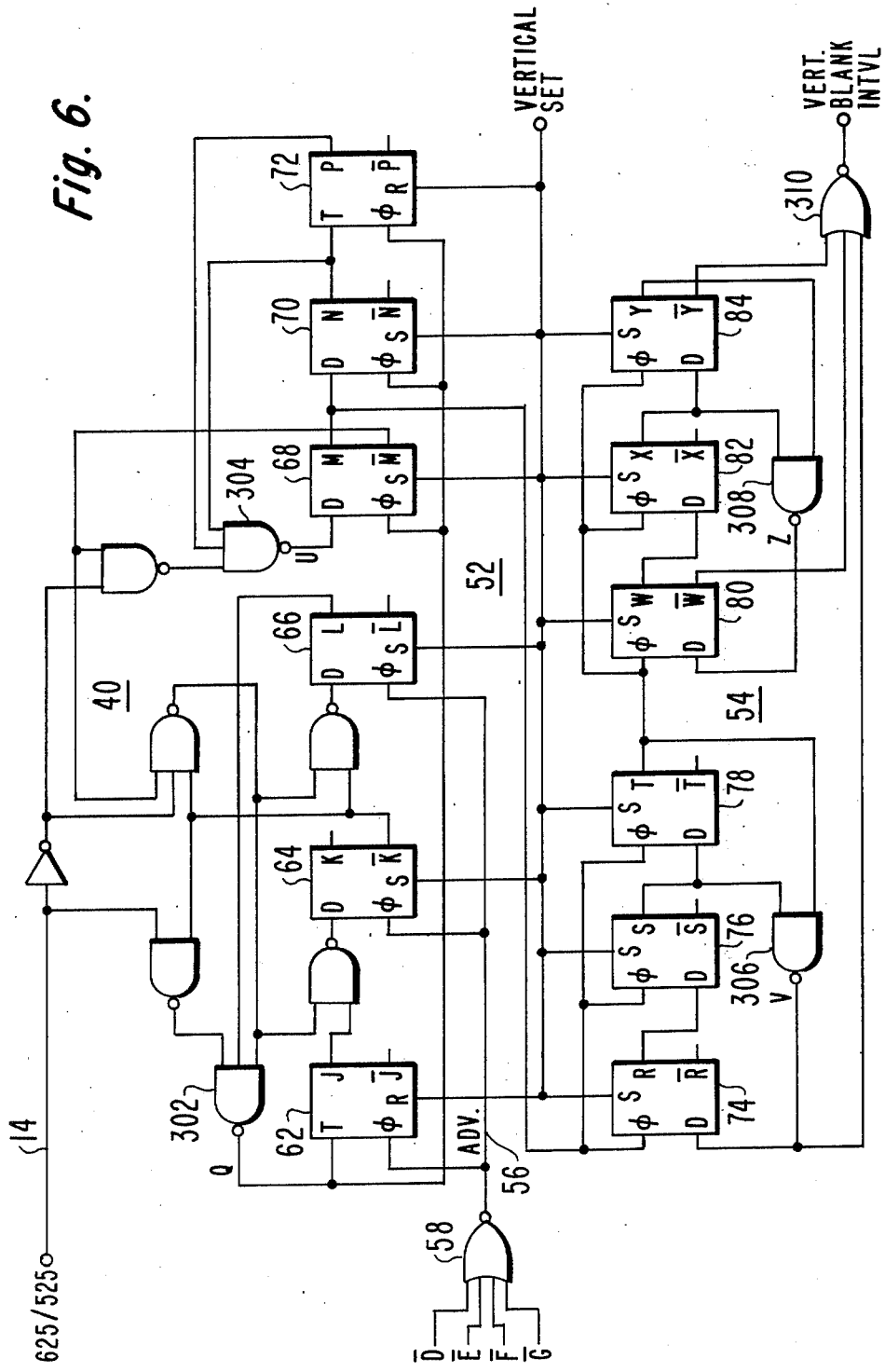
FIG. 6 illustrates schematically a circuit arrangement suitable for use in the vertical counter of FIG. 5.

FIG. 6 is a schematic diagram of an embodiment of vertical counter 40. Counter 52 is partitioned into two separately clocked stages. The first stage is comprised of flip-flops 62, 64 and 66, and the second stage is comprised of flip-flops 68, 70 and 72. The first stage is clocked by the ADVANCE pulse on conductor 56 which is generated by NOR gate 58. The ADVANCE pulse is generated by the simultaneous occurrence of flip-flop outputs D, E, F, and G of horizontal counter 30. The ADVANCE pulse begins at count 56 and ends after count 63 of the horizontal counter, as illustrated in FIG. 4.

Since all of the flip-flops in vertical counter stages 52 and 54 are not clocked synchronously, but are clocked in groups of three, some propagation delay occurs between the leading edge of the ADVANCE pulse on conductor 56 and the setting or resetting of the final flip-flop 84. Although the outputs of the individual flip-flop stages are used to generate changes in the vertical decoder gating 60 output signals, the propagation delays of stages 52 and 54 in the vertical counter do not adversely affect the system for two reasons. First, the ADVANCE clock pulse is eight 134 H clock periods in duration and occurs at the end of a horizontal counter sequence, during counts 56 through 63. Since the vertical decoder gating outputs are timed to change state at or shortly after the beginning of a horizontal counter cycle, the clocking of the vertical counter at the end of the previous 67 count sequence allows sufficient time for the propagation delays of the vertical counter to settle out before the outputs of the vertical counter are used by the vertical decoder gating during the next horizontal counter cycle. Secondly, it will be seen that all of the signal outputs of vertical decoder gating 60 are synchronously clocked by the 134 H clock, thus ensuring that the vertical decoder gating output signals occur synchronously at or after the beginning of a horizontal counter cycle.

As FIG. 6 illustrates, counter stage 52 is controlled to divide the ADVANCE clock input by 21 or 24 in accordance with the state of the 625/525 control signal on conductor 14. Flip-flops 62, 64, 66 are synchronously clocked by the ADVANCE clock and their outputs are gated to generate signal Q at the output of NAND gate 302. The Q signal is used to synchronously clock flip-flops 68, 70, 72 in counter stage 52. Output signals M, N and P of flip-flops 68, 70 and 72 are combined in NAND gate 304 to generate a feedback control signal U.

Output signal M of counter stage 52 is used to synchronously clock flip-flops 74, 76, 78 of divide-by-25 counter stage 54. Output signal T of flip-flop 78 is used to synchronously clock flip-flops 80, 82, 84. Output signals S and T of flip-flops 76 and 78 are combined in NAND gate 306 to generate feedback control signal V. Likewise, output signals X and U of flip-flops 82 and 84 are combined in NAND gate 308 to generate feedback signal Z. Output signals, V, $\overline{W}$ and $\overline{Y}$ are combined in NOR gate 310 to generate a VERTICAL BLANKING INTERVAL signal with a duration of 25 lines for a 625-line system and 21 lines for a 525-line system.

The flip-flops of vertical counter 40 may be reset to an initial condition at the second broad vertical sync pulse by the VERTICAL SET signal.

An embodiment of vertical decoder gating 60 is illustrated schematically in FIGS. 7, 8, 9, 10 and 11. Vertical decoder gating 60 is comprised of logical gates which utilize output pulses from the horizontal and vertical counters to determine the timing for the beginnings and endings of the various output signals for the sync generator. The signal outputs are generated by the setting and resetting of flip-flops which are synchronously clocked by the 134 H clock. The use of logic gates rather than separate counters for the control of the output signal flip-flops minimizes the number of components required for the vertical decoder, since 2-input logic gates typically require only four transistors apiece, whereas counting flip-flops typically require twenty-two transistors each. The low component count of the present invention is especially advantageous when the sync generator is implemented in integrated circuit form. Flip-flops are required for the signal outputs to assure synchronization of the output signals to the 134 H clock.

Figure 11:
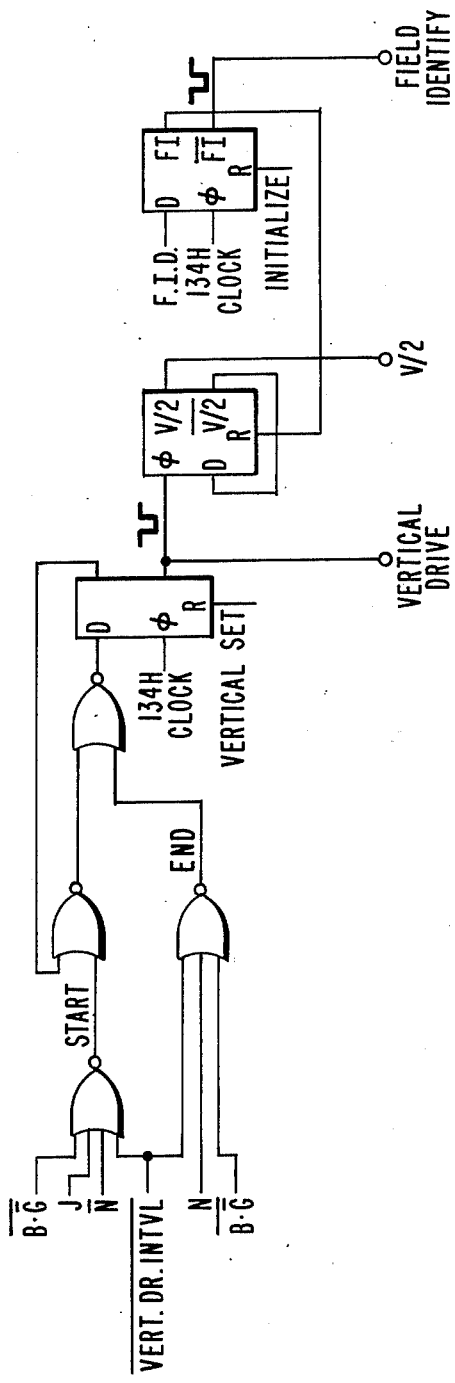

As FIGS. 7, 8, 9, 10 and 11 illustrate, all of the signal outputs of vertical decoder gating 60 are generated by the setting and resetting of D-type flip-flops which are synchronously clocked by the 134 H clock. The V/2 output signal in FIG. 11 is not clocked directly by the 134 H clock, but is derived from the VERTICAL DRIVE signal which is synchronously controlled.

The digital circuitry of FIGS. 7, 8, 9, 10 and 11 will not be discussed in further detail, as the operation of these circuits is apparent from the drawings to one skilled in the art. The output signals of the flip-flops shown in these FIGURES may be buffered to provide increased signal stability and drive capability.

The operation of the sync generator is illustrated by the broken waveforms shown in FIG. 12. The waveforms there shown are representative of the horizontal rate output signals of the sync generator. Waveform (a) is a representation of the 134 H clock. Horizontal counter 30 completes two full counting cycles while counting from 0 to 134. As shown in waveform (a), the 134th count of the horizontal counter is the first, or zero count, of the next horizontal line.

The horizontal blanking interval of the SYSTEM BLANKING signal is shown in waveform (b). The SYSTEM BLANKING Pulse begins at the start of a horizontal line at count 0 and terminates at count 23 for a 525-line system and at count 25 for a 625-line system.

The horizontal SYNC pulse is shown in the bold lines of waveform (c). The horizontal SYNC pulse begins at count 3 of the 134 H clock and terminates at count 13. When the sync generator is producing equalizing pulses during the vertical interval, the pulse is five 134 H clock pulses wide and terminates at count 8 as shown by broken line 202. If the sync pulse has not been terminated at count 8 or count 13, the vertical decoder gating 60 automatically terminates the pulse at count 60 as shown by broken line 204. A sync pulse beginning at count 3 and ending at count 60 is a broad vertical pulse which occurs during the vertical interval.

The equalizing pulses and broad vertical pulses occur during the vertical interval at half-line intervals. The equalizing and broad vertical pulses which occur during the second half of the horizontal line are represented in waveform (c) by broken lines 206, 212, and 214. The half-line equalizing pulses begin at broken line 206 and end at broken line 212. The half-line broad vertical pulses begin at broken line 206 and terminates at broken line 214. The interval 208 between the end of a broad vertical pulse and the beginning of the succeeding vertical pulse is the vertical serration interval, which has a duration of ten 134 H clock pulses.

The HORIZONTAL DRIVE/CHROMA signal is represented in waveform (d). This pulse is fifteen 134 H clock pulses in duration, beginning at count 0 and ending at count 15.

The BURST signal is shown in waveform (e). The BURST pulse is five 134 H clock pulses in duration, beginning at count 14 and ending at count 19.

The H signal is shown in waveform (f). This signal has a period of one horizontal line and changes state at counts 0 and 67 of the 134 H clock.

The H/2 signal is shown in waveform (g). This waveform has a 2-line period and changes state at count 3 of the 134 H clock.

The SET and RESET control lines for the H and H/2 flip-flops may be used to initialize the waveforms shown in (f) and (g) of FIG. 12.

The HORIZONTAL ADVANCE/RETARD signal is shown in waveform (h). This pulse occurs once every horizontal line, beginning at 134 H clock count 103 and ending at clock count 119. The HORIZONTAL ADVANCE/RETARD signal always occurs 31 clock counts before the beginning of the next horizontal line and may be utilized to synchronize the sync generator to an external signal source.

FIG. 13 shows the vertical rate synchronization signals produced by the sync generator for the 525-line NTSC and PAL-M systems. The BOTTLE GATE signal is produced when the sync generator is in the 525-line mode, but, since it is a SECAM standard signal, it is generally not used by broadcast equipment in these systems. The FIELD IDENTIFY signal contains a pulse at the beginning of field 2, which permits identification of this particular field. The input control signals of the sync generator may then be used to synchronize the sync generator to a particular fields during the next vertical interval.

FIG. 14 illustrates the vertical rate signals for the 625-line PAL and SECAM systems. The BOTTLE GATE signal is a pulse with a duration of nine horizontal lines for the SECAM system beginning at the second horizontal sync pulse after the vertical interval. The NARROW VERTICAL BLANKING signal has a duration of 20 ½ lines and is generally not used in the PAL and SECAM systems. The FIELD IDENTIFY pulse appears at the beginning of field 3 in the 625-line systems.

FIG. 14 clearly shows the changing relationship between the PAL BLANKING signal and the COMPOS-ITE SYNC signal for each of the four fields. In fields 1 and 2, the PAL BLANKING signal begins at the occurrence of the last horizontal sync signal before the vertical interval. In field 3, the PAL BLANKING signal begins at the second-last horizontal sync signal before the vertical interval, and in field 4 the PAL BLANKING signal begins at the occurrence of the first equalizing pulse.

Table 1

| TV Standard | PAL-M | PAL | NTSC | SECAM |
|---|---|---|---|---|
| 625/525 | 0 | 1 | 0 | 1 |
| PAL /PAL-M NTSC/SECAM | 0 | 1 | 1 | 0 |
| Chrominance Subcarrier, MHz | 3.58 | 4.43 | 3.58 | 4.41($f_{or}$) |
| Pre-Scaler | 3 | 5 | 5 | 3 |
| Counter Decoder Subcarrier | 303 | 227 | 182 | 376 |
| Counter | 909 | 1,135 | 910 | 1,128 |
| H/4, Hz | 15,750/4 | 15,625/4 | 15,750/4 | 15,625/4 |

FIG. 15 is a block diagram illustrating subcarrier counter 10 of FIG. 1 in further detail. Pre-scaler 20 receives inputs from standard select conductor 16 and a chrominance subcarrier signal from conductor 18. Pre-scaler 20 is coupled to binary ripple counter 22. Output signals from binary ripple counter 22 are coupled to counter decoder 24, which also receives input signals from the standard select controls on conductors 14 and 16. An H/4 signal appears on conductor 26 at the output of counter decoder 24. A reset signal is also coupled to the binary ripple counter from the counter decoder.

Pre-scaler 20 divides the chrominance subcarrier signal by a factor of 3 or 5. The appropriate divisor is selected by the standard select signal of conductor 16, as illustrated in Table 1. The chrominance subcarrier signal is divided by 3 when the PAL-M or SECAM standards are selected, and by 5 when either PAL or NTSC are selected. Pre-scaler 20 utilizes a synchronous counter, since the chrominance subcarrier varies in frequency from 3.58 MHz for NTSC and PAL-M to 4.41 MHz and 4.43 MHz for SECAM (red subcarrier) and PAL, respectively. The divided-down output signal of the pre-scaler is thus a lower frequency signal which permits the use of a binary ripple counter for counter 22.

Binary ripple counter 22 further divides down the signal produced by pre-scaler 20. The binary ripple counter is a nine stage counter. The outputs of each of the nine stages are coupled to counter decoder 24. The counter decoder 24 determines the maximum count of the binary ripple counter for the selected television standard. As illustrated in Table 1, counter decoder 24 will divide the pre-scaler output signal by a different divisor for each television standard. When the binary ripple counter has reached the appropriate count for the selected television standard, the H/4 signal on conductor 26 is produced, and binary ripple counter 22 is reset in preparation for the next counting cycle. Table 1 illustrates the total count of subcarrier counter 10 for each television standard and the resultant frequency of the H/4 signal.

Subcarrier counter 10 is illustrated schematically in FIG. 16. The chrominance subcarrier on conductor 18 is applied to "D" type flip-flops 220, 222 and 223 in pre-scaler 20 to synchronously clock these flip-flops. The STANDARD SELECT control on conductor 16 is applied to gates 224-228 to select either division by 3 or division by 5. The outputs of flip-flops 222 and 223 are combined at NAND gate 218 to generate the pre-scaler output signal, which has a frequency of either ¼ or 1/5 the chrominance subcarrier frequency. The pre-scaler output signal from NAND gate 218 is also coupled to the "D" input of flip-flop 220 to recycle the pre-scaler counter.

Ripple counter 22 is clocked by the pre-scaler output signal from NAND gate 218. The ripple counter is comprised of nine coupled flip-flop stages which produce nine output signals, illustrated as (1) through (256). The complements of these output signals are not shown, but are also available as outputs.

Counter decoder 24 receives input signals from the standard select controls and the outputs of the ripple counter. The logic gates in the counter decoder sense the count which equals the proper divisor for the selected television standard. For instance, the SECAM output signal from gate 240 occurs at the sum of counts (256) and (8) from NOR gate 244, and counts (64), (32) and (16) from inputs to gate 240. The sum of these counts is 376, which is the proper divisor for the counter decoder in the SECAM system, as shown in Table 1. Gates 230-238 operate in a similar manner for the PAL, NTSC and PAL-M systems, but also require inputs from the standard select controls to determine the proper divisor which appears at the output of NAND gate 230. The SECAM gates 240 and 244 require no inputs from the standard select controls, since the SECAM divisor of 376 is reached only if none of the divisor counts for the other systems have been previously decoded by gates 230-238.

The sensing of the proper divisor at the output of NAND gate 230 or 240 causes the flip-flop 210 to change state, thereby applying a low signal to the reset input of ripple counter 22 and generating an H/4 output signal on conductor 26. The reset pulse is applied to the ripple counter for only one-half of the period of the pre-scaler output signal, since flip-flop 210 changes to its initial state with the occurrence of a failing edge of the pre-scaler output signal from NAND gate 218. This falling edge occurs at the middle of the pre-scaler pulse period, thereby permitting the ripple counter to resume counting with the next pre-scaler output pulse.

FIG. 17 illustrates a technique for synchronizing the 134 H clock of the waveform decoder to the chrominance subcarrier signal. The HORIZONTAL ADVANCE/RETARD signal from the sync generator 8 is coupled to a divide-by-4 counter 92. The output of the divide-by-4 counter is coupled to advance/retard control 94. The output of the advance/retard control 94 is coupled to one input of phase detector 96. The H/4 signal from sync generator 8 is also coupled to phase detector 96. The output of the phase detector is coupled to low pass filter 98. The output of low pass filter 98 is coupled to voltage controlled oscillator 100. The output of the voltage controlled oscillator is coupled to the 134 H input of the sync generator.

In operation, the chrominance subcarrier signal which is applied to the sync generator is appropriately divided down to obtain an H/4 output signal which has a fixed phase relationship to the chrominance subcarrier signal. A HORIZONTAL ADVANCE/RETARD signal, which has a horizontal line frequency and precedes the horizontal sync pulse by a predetermined time interval, is divided by 4 to obtain a one-quarter horizontal line rate signal. This signal is then advanced or retarded by advance/retard control 94 and applied to phase detector 96, where the phase difference between the H/4 signal and the divided and phase-shifted HORIZONTAL ADVANCE/RETARD signal is used to generate an output control signal. The output control signal passes through low pass filter 98 and is used to control voltage controlled oscillator 100. The voltage controlled oscillator is thus regulated in phase and frequency so that a proper phase relationship is maintained between the 134 H clock signal and the chrominance subcarrier signal, from which the H/4 signal is derived.

When the sync generator is utilized in a television camera chain, signal delays may occur in cables between the television cameras and their control units. These delays may be taken into consideration in the timing of the 134 H clock signal by appropriately advancing or retarding the advance/retard control 94. In this manner, the output signals from the sync generator will be appropriately delayed or advanced for cable delays in the television camera system. The synchronizing signals of the television camera will thus have a proper phase and frequency when they are received by the camera control equipment.

The present invention generates a PAL blanking signal in addition to the normal system and narrow vertical blanking signals. The PAL blanking signal has a nine-line duration in a 625-line system and an eleven-line duration in a 525-line system. This signal occurs during the field synchronizing interval and is used to ensure proper phasing of the color burst signal from one field to another by blanking the color burst signal during specific portions of the field synchronizing interval. In order to perform this function, the PAL blanking signal begins and ends at different points in the four vertical fields of the television system.

Since the PAL blanking signal has a period of four fields, it is customary to count vertical fields in order to generate a correct PAL blanking signal. If the field count is known, the sync generator can generate the corresponding PAL blanking signal. However, counters are undesirable in integrated circuit sync generators because they require large numbers of transistors and resistors and result in propagation delays which are in excess of those which are characteristic of logic gates. The present invention overcomes these disadvantages by providing a PAL blanking signal generator without the use of a field counter.

It was discovered that the PAL blanking signal will always begin and end during specific time intervals, or "windows," which precede and follow the field synchronizing interval. The PAL blanking signal will begin during a three half-line window which precedes the first equalizing pulse interval, and will end during a three half-line window which follows the second equalizing pulse interval in a 625-line system. In a 525-line system, the end window is delayed for one-half line after the second equalizing pulse interval. Moreover, a transition of the H/2 signal of one polarity will precisely define the position of the leading edge of the PAL blanking signal during the "start" window, and a transition of the H/2 signal of the opposite polarity will determine the trailing edge of the signal during the "end" window. The PAL blanking signal generator of the present invention relies upon the foregoing principles to generate a PAL blanking signal without the use of field counters.

The PAL blanking signal generator of the present invention is illustrated for the 625-line system by the waveforms shown in FIG. 18. The equalizing and vertical sync intervals are illustrated by waveform 402.

Equalizing pulse intervals 404 and 408, as well as vertical sync interval 406, are each five half-lines in duration. Start window 410 has a duration of three half-lines and precedes equalizing interval 404. The end window 412 has a duration of three half-lines and follows equalizing interval 408. Since each vertical field is comprised of an odd number of half lines, the H/2 signal 420 will advance in phase by one-half line from one field to another. The advancing phase of the H/2 signal 420 changes the time of occurrence of a positive-going transition of the signal during start window 410, thus changing the start of the PAL blanking signal 422 in each of the four vertical fields. Likewise, the advancing phase of the H/2 signal 420 changes the time of occurrence of a negative-going transition of the signal during the end window 412 for successive vertical fields, thus properly terminating the nine-line PAL blanking signal for each field in the 625-line system.

The eleven-line PAL blanking signal of the 525-line system is illustrated in FIG. 19. Waveform 502 illustrates equalizing pulse intervals 504 and 508, and vertical sync interval 506, which are each six half-lines in duration. Start window 510 is identical to start window 410 in FIG. 18, having a duration of three half-lines preceding equalizing pulse interval 504. The end window 512 is also three half-lines in duration, but does not begin until one-half line after the second equalizing pulse interval 508. As in the 625-line system, the generation of PAL blanking signal 522 follows the changing phase relation of the H/2 signal 520 from one field to another. PAL blanking signal 522 begins at the occurrence of a positive-going transition of H/2 signal 520 during start window 510, and ends at the occurrence of a negative-going transition of H/2 signal 520 during end window 512.

Figure 9:
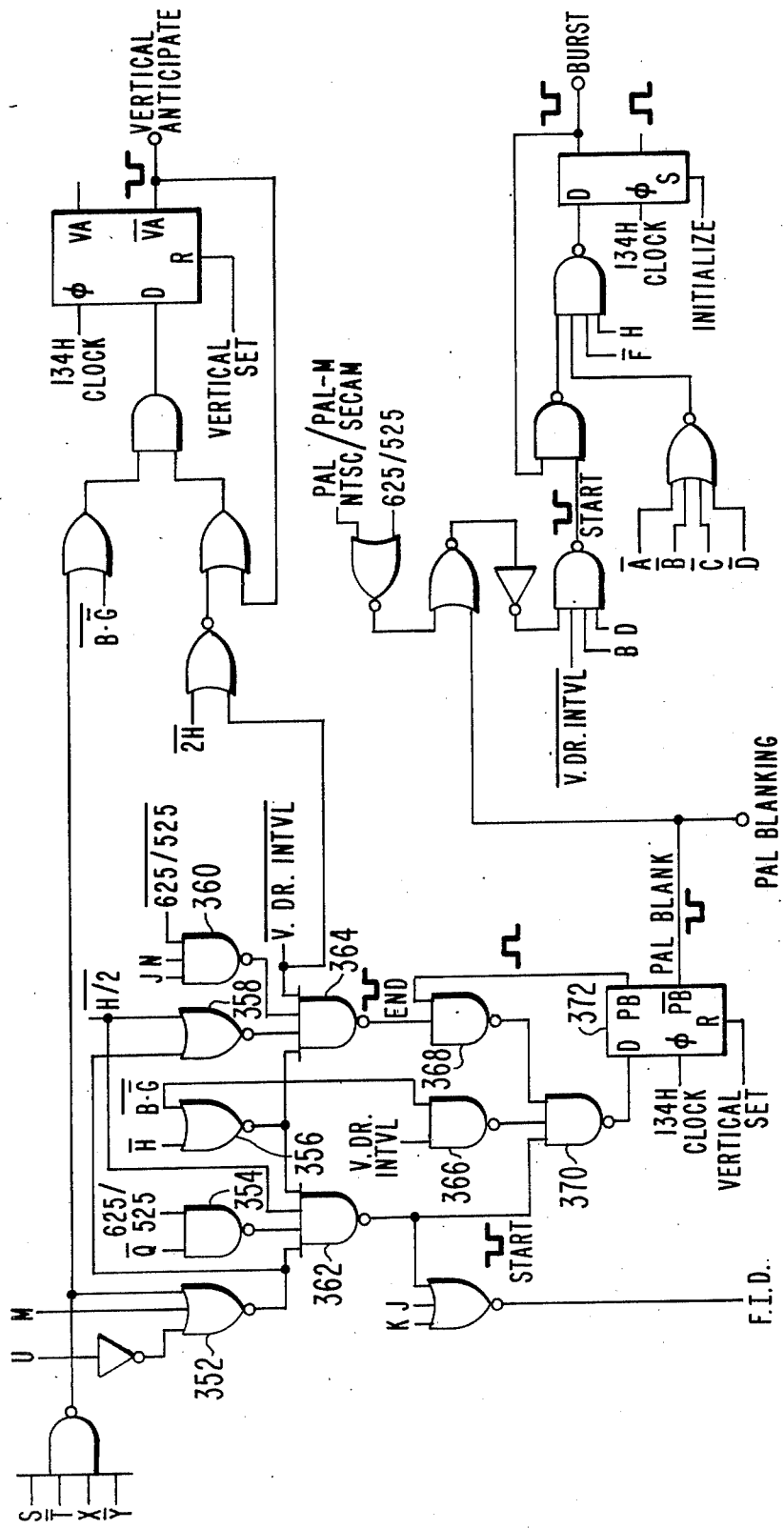
Figure 10:
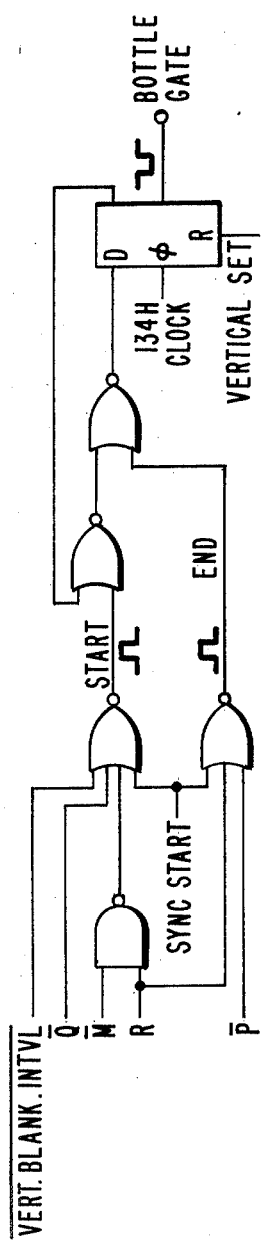

In the preferred embodiment of the PAL blanking signal generator shown in FIG. 9, the principles of FIGS. 18 and 19 have been combined and implemented to take advantage of the signals generated by the vertical counter shown in FIG. 6. The PAL blanking signal is produced by flip-flop 372 when a start pulse is generated by a NAND gate 362, and terminates when an end pulse is generated by a NAND gate 364. The PAL blanking signal is retimed by the clocking of flip-flop 372 by the 134 H clock. The flip-flop will latch when set by the coupling of its PB output terminal to gate 368, and will remain latched until reset by the generation of an end pulse from gate 364.

The start window for the 625-line system is determined by a pulse in the Q signal from the vertical counter 40 which precedes the VERTICAL DRIVE INTERVAL signal. The VERTICAL DRIVE INTERVAL signal is a field rate pulse which begins with the first equalizing pulse of the vertical interval, and terminates after the last equalizing pulse period in the vertical interval. The Q pulse preceding the VERTICAL DRIVE INTERVAL signal has a duration of three half-lines preceding the first equalizing pulse interval and is coupled to one input of a NAND gate 354. When the sync generator is operating in the 525-line system, NAND gate 354 is disabled by the 625/525 select signal, and the start window is governed by the $\overline{M}$ signal coupled to one input of NOR gate 352. The $\overline{H/2}$ signal is coupled directly to one input of gate 362. The timing of the start pulse at the output of gate 362 is advanced by the use of the $\overline{H/2}$ signal and an H.B.G signal at the output of gate 356. These signals ensure that the start pulse appears at the D input to flip-flop 372 in advance of the setting of the flip-flop so that the PAL blanking signal can be retimed by the 134 H clock. The signal produced at the output of NAND gate 366 is a default condition signal which begins the PAL blanking signal if a start pulse has not been produced previously by NAND gate 362. Gate 366 starts the PAL blanking signal which begins at the occurrence of the first equalizing pulse—field 1 for the 525-line system and field 4 for the 625-line system.

After the second equalizing pulse interval, the VERTICAL DRIVE INTERVAL signal coupled to one input of NAND gate 364 goes high, permitting the generation of an end pulse at the output of NAND gate 364. The end window for the 625-line system is determined by the coincidence of the H.B.G. signal from NOR gate 356 with an H/2 signal at the output of NOR gate 358. The coupling of the output of NOR gate 352 to one input of NOR gate 358 prevents the generation of an end pulse during the start window.

In the 525-line system, the end window is similarly determined by the coincidence of the H.B.$\overline{G}$. and H/2 signals at the inputs to gate 364. The end window is delayed for one half-line after the second equalizing pulse interval by the output from NAND gate 360. The J and N signals applied to the inputs of gate 360 are high during this half-line period, as is the $\overline{625/525}$ input signal, thereby disabling end gate 364 for one-half line after the second equalizing pulse interval. Gate 360 is disabled in the 625-line system by the $\overline{625/525}$ signal.

The generation of a negative-going end pulse at the output of gate 364, together with a positive, latched output from the PB terminal of flip-flop 372, will produce a high signal at the output of NAND gate 368 and a low signal from the output of NAND gate 370 to the D input of flip-flop 372. This low signal is retimed by the 134 H clock signal coupled to flip-flop 372, thereby terminating the PAL blanking signal in phase with the 134 H clock.

What is claimed is:

1. A television synchronizing signal generator comprising:

a source of clock pulses;

a synchronous horizontal counter responsive to said clock pulses from said source for producing signals having frequencies which are integral multiples of the horizontal line frequency of the television signal;

a vertical counter coupled to an output of said synchronous horizontal counter for producing signals having frequencies which are integral divisions of twice the line frequency of the television signal, said vertical counter being clocked by a signal which is advanced in phase relative to the lowest frequency signal produced by said synchronous horizontal counter;

output means for generating blanking, sync and drive signals;

gating means coupled to said synchronous horizontal counter and said vertical counter for conditioning said output means for the generation of said blanking, sync and drive signals; and means for rendering said output means responsive to said clock pulses so that said blanking, sync and drive signals are phase-related to said clock pulses.

2. The television synchronizing signal generator of claim 1, wherein:

said vertical counter is clocked at the count of the synchronous horizontal counter at which the broad vertical pulses in the vertical synchronizing interval are terminated.

3. The television synchronizing signal generator of claim 1, wherein:
said synchronous horizontal counter, said vertical counter, said output means, said gating means and said means for rendering are realized in integrated circuit form on a single, monolithic integrated circuit chip.

4. A multiple standard televison synchronizing signal generator comprising:
a source of clock pulses which provides pulses at a first rate for a 525-line sync standard and at a second rate for a 625-line sync standard;
means for programming the synchronizing signal generator for operation according to a selected sync signal standard and having a first input terminal for selecting a particular horizontal line frequency and a second input terminal for selecting a particular sync signal standard;
a synchronous horizontal counter responsive to said clock pulses from said source for producing signals having frequencies which are integral multiples of the selected horizontal line frequency;
a vertical counter coupled to an output of said synchronous horizontal counter and programmed by said programming means for operation at a selected horizontal line frequency for producing signals having frequencies which are integral divisions of twice the selected horizontal line frequency, said vertical counter being clocked by a signal which is advanced in phase relative to the lowest frequency signal produced by said synchronous horizontal counter;
output means for generating blanking, sync and drive signals of the selected sync signal standard;
gating means coupled to said programming means, said synchronous horizontal counter and said vertical counter for conditioning said output means for the generation of said blanking, sync and drive signals; and
means for rendering said output means responsive to said clock pulses so that said blanking, sync and drive signals are phase-related to said clock pulses.

5. The multiple standard television synchronizing signal generator of claim 4, wherein:
said programming means, said synchronous horizontal counter, said vertical counter, said output means, said gating means and said means for rendering are realized in integrated form on a single, monolithic integrated circuit chip.

6. The multiple standard televison synchronizing signal generator of claim 4, wherein:
said source of clock pulses provides pulses at a frequency which is 134 times the horizontal line rate of the selected sync standard.

7. The multiple standard television synchronizing signal generator of claim 4, wherein:
said source of clock pulses provides pulses at a frequency which is 82 times the horizontal line rate of the selected sync standard.

8. The multiple standard television synchronizing signal generator of claim 4, wherein:
said source of clock pulses provides pulses at a frequency which is 110 times the horizontal line rate of the selected sync standard.

9. The multiple standard television synchronizing signal generator of claim 4, wherein:
said programming means selects a sync signal standard from the group consisting of 625-line PAL, 625-line SECAM, 525-line NTSC, and 525-line PAL-M.

10. The multiple standard television synchronizing signal generator of claim 4, wherein:
said synchronous horizontal counter further includes feedback gating means for counting directly from the maximum count to the minimum count of said counter.

11. The multiple standard television synchronizing signal generator of claim 4, wherein:
said vertical counter is partitioned into a first stage for counting either 21 or 25 half lines and a second stage which divides the count of said first stage by 25.

12. The multiple standard television synchronizing signal generator of claim 9, wherein:
said vertical counter stages further include feedback gating logic for determining the maximum counting states of said stages.

13. The multiple standard television synchronizing signal generator of claim 4, wherein:
said output means comprises latching flip-flops which are clocked by said source of clock pulses.

14. The multiple standard television synchronizing signal generator of claim 4, further comprising:
programmable subcarrier dividing means coupled to said programming means for dividing the subcarrier reference signal of the selected sync standard by one of a plurality of predetermined factors so that a signal related to the horizontal synchronizing signal of the selected sync standard is produced.

15. The multiple standard television synchronizing signal generator of claim 12, wherein:
said programming means, said synchronous horizontal counter, said vertical counter, said output means, said gating means, said means for rendering, and said programmable subcarrier dividing means are realized in integrated form on a single, monolithic integrated circuit chip.

16. The multiple standard television synchronizing signal generator of claim 4, wherein:
said output means generates a pulse which precedes the horizontal sync signal of the selected sync standard by a predetermined time.

17. A television synchronizing signal generator for producing a PAL burst blanking signal comprising:
a source of clock pulses;
a horizontal counter responsive to said clock pulses from said source for producing an H/2 signal having a frequency of half the horizontal line frequency and a plurality of signals having frequencies which are integral multiples of the horizontal line frequency;
a 625-line vertical counter coupled to said horizontal counter for producing signals which are integral multiples of the vertical field rate;
a first enabling gate coupled to said vertical counter for generating a first enabling pulse having a duration equal to that of the three half-lines which precede the first equalizing pulse interval in a vertical field;
a second enabling gate coupled to said vertical counter for generating a second enabling pulse having a duration of three half-lines, said second enabling pulse beginning after the last equalizing pulse interval in the vertical field; and output means coupled to said horizontal counter and said enabling gates for producing a PAL burst blanking signal, wherein the beginning of said PAL burst blanking signal is determined by the coincidence of said first enabling pulse and the transition of said H/2 signal from a first state to a second state, and the termination of said PAL blanking signal is determined by the coincidence of said second enabling pulse and the transition of said H/2 signal from said second state to said first state.

18. A television synchronizing signal generator for producing a PAL burst blanking signal comprising:
a source of clock pulses;
a horizontal counter responsive to said clock pulses from said source for producing an H/2 signal having a frequency of half the horizontal line frequency and a plurality of signals having frequencies which are integral multiples of the horizontal line frequency;
a 525-line vertical counter coupled to said horizontal counter for producing signals which are integral multiples of the vertical field rate;
a first enabling gate coupled to said vertical counter for generating a first enabling pulse having a duration equal to that of the three half-lines which precede the first equalizing pulse interval in a vertical field;
a second enabling gate coupled to said vertical counter for generating a second enabling pulse having a duration of three half-lines, said second enabling pulse beginning one-half line after the last equalizing pulse interval in the vertical field; and
output means coupled to said horizontal counter and said enabling gates for producing a PAL burst blanking signal, wherein the beginning of said PAL burst blanking signal is determined by the coincidence of said first enabling pulse and the transition of said H/2 signal from a first state to a second state, and the termination of said PAL blanking signal is determined by the coincidence of said second enabling pulse and the transition of said H/2 signal from said second state to said first state.

* * * * *

UNITED STATES PATENT AND TRADEMARK OFFICE
CERTIFICATE OF CORRECTION

PATENT NO. : 4,169,659

DATED : October 2, 1979

INVENTOR(S) : Frank Jerome Marlowe

It is certified that error appears in the above-identified patent and that said Letters Patent is hereby corrected as shown below:

Column 8, line 7, that portion reading "produces and H/2" should read --produces an H/2--. Column 9, line 24, that portion reading "a low signals" should read --a low signal--. Column 12, line 9, that portion reading "output signals X and U" should read --output signals X and Y--. Column 12, line 20, that portion reading "logical gates" should read --logic gates--. Column 13, line 55, that portion reading "particular fields" should read --particular field--. Column 15, line 40, that portion reading "failing edge" should read --falling edge--. Column 18, line 15, that portion reading "the H.B.G. signal" should read --the H.B.$\overline{G}$ signal--. Column 18, line 21, that portion reading "the H.B.$\overline{G}$. signal" should read --the H.B.$\overline{G}$ signal--.

Signed and Sealed this

Eighteenth Day of December 1979

[SEAL]

Attest:

SIDNEY A. DIAMOND

Attesting Officer

Commissioner of Patents and Trademarks